United States Patent [19]
Abe et al.

[11] Patent Number: 5,533,168
[45] Date of Patent: Jul. 2, 1996

[54] DATA PROCESSING APPARATUS FOR OBTAINING OPTIMUM COMBINATION SOLUTION AND METHOD OF OBTAINING OPTIMUM COMBINATION SOLUTION

[75] Inventors: Shigeo Abe, Katsuta; Junzo Kawakami, Mito, both of Japan

[73] Assignee: Hitachi, Ltd., Tokyo, Japan

[21] Appl. No.: 400,018

[22] Filed: Mar. 6, 1995

Related U.S. Application Data

[63] Continuation of Ser. No. 952,668, Sep. 28, 1992, abandoned, which is a continuation of Ser. No. 825,830, Jan. 28, 1992, abandoned, which is a continuation of Ser. No. 582,187, Sep. 26, 1990, abandoned.

[30] Foreign Application Priority Data

Feb. 10, 1989 [JP] Japan ................................. 1-029818
Oct. 12, 1989 [JP] Japan ................................. 1-263845

[51] Int. Cl.$^6$ ........................... G06F 15/18; G06F 15/20
[52] U.S. Cl. ............................................................ 395/22
[58] Field of Search ............................. 395/22, 24, 21

[56] References Cited

U.S. PATENT DOCUMENTS

| | | | |
|---|---|---|---|
| 4,660,166 | 4/1987 | Hopfield | 364/807 |
| 5,016,188 | 5/1991 | Lan | 395/24 |
| 5,050,096 | 9/1991 | Seidman | 364/513 |
| 5,200,908 | 4/1993 | Date et al. | 364/491 |

OTHER PUBLICATIONS

Peterson et al., "A New Method for Mapping Optimization Problems onto Neural Networks", Intl. J. of Neural Systems, 1989, 3–22.

Tagliarini et al., "Learing in Systematically Designed Networks" IJCNN, Jun. 1989, I–497 to I–502.

Abe, S. "Theories on the Hopfield Neural Networks", IJCNN, Jun. 1989, I–557 to I–564.

Jutamulia et al., "Optical Associative Memory with Nonzero Diagonal Interconnectioin Matrix Based on Electron Trapping Materials", IJCNN, Jun. 1989, II–633.

Lee et al., "Neural Network Processing Through Energy Minimization With Learing Ability to the Multiconstraint Zero–One Knapsack Problem", IEEE Intl. Wkshp. on Tools for Artificial Intelligence, Oct. 1989, 548–555.

Gaspin, C., "Automatic Translation of Constraints for Solving Optimization Problems by Neural Networks", IJCNN, Jun. 1990, VI–857 to III–861.

Abe, S., "Convergence of the Hopfield Neural Networks with Inequality," IJCNN, Jun. 1990, III–869 to III–874.

*Primary Examiner*—Robert W. Downs
*Attorney, Agent, or Firm*—Antonelli, Terry, Stout & Kraus

[57] ABSTRACT

In a data processing apparatus employing a neurocomputer suitable for obtaining an optimum combination problem, a weight is determined based upon a relative relationship between a constraint condition and an evaluation function, and it is so arranged as to obtain a solution having low energy with respect to a solution obtained from an energy function with employment of this determined weight by increasing a diagonal element of the energy function. It is possible to give a minimum value or a solution near this minimum value at a high speed with regard to any problems.

13 Claims, 29 Drawing Sheets

COST 3.7

COST 4.5

COST 5.2

COST 10.1

FIG. 14

| INITIAL VALUE (VARIATION FROM 1/2) | CONVERGENCE VALUE |
|---|---|
| 0 0 0 0 | INTERNAL UNSTABLE POINTS |
| + 0 0 0 | 1 0 0 1 |
| − 0 0 0 | 0 1 1 0 |
| + + − − | 1 1 0 0 |
| + − + − | 1 0 1 0 |
| − + − + | 0 1 0 1 |
| − − + + | 0 0 1 1 |

| DIAGONAL ELEMENT | INCREASED BY 0.2 | INCREASED BY 0.4 | INCREASED BY 0.8 |
|---|---|---|---|
| 1 | -9.74 | -9.37 | -9.87 |
| 14 | -9.75 | -9.34 | -9.34 |
| 23 | -10.03 | -9.67 | -9.39 |
| 32 | -9.99 | -9.87 | -9.87 |
| 49 | (-10.28) | -10.04 | -10.20 |
| 58 | -10.11 | -10.11 | -10.11 |
| 70 | -10.16 | (-10.16) | -10.16 |
| 77 | -9.94 | -9.81 | (-10.47) |
| 85 | -9.47 | -9.47 | -9.47 |
| 96 | -9.52 | -9.20 | -9.52 |

FIG. 16

| DIAGONAL ELEMENT | INCREASED BY 0.2 | INCREASED BY 0.3 |
|---|---|---|
| 1 | −127.21 | −125.67 |
| 16 | −131.60 | −125.83 |
| 39 | −132.28 | −132.28 |
| 44 | −125.82 | −125.75 |
| 61 | −126.64 | −128.82 |
| 76 | −130.56 | −128.62 |
| 84 | −131.23 | −130.72 |
| 93 | −128.65 | −125.94 |
| 112 | (−133.76) | (−133.67) |
| 121 | −133.19 | −133.19 |
| 137 | −131.64 | −129.86 |
| 153 | −129.85 | −121.12 |
| 168 | −130.02 | −131.51 |

FIG. 17

| INITIAL VALUE | INCREASED BY 0.03 | INCREASED BY 0.04 |
|:---:|:---:|:---:|
| 1 | −10.39 | −9.85 |
| 14 | −9.89 | −9.88 |
| 23 | −10.21 | −10.21 |
| 32 | −10.26 | −10.26 |
| 49 | −9.65 | (−10.47) |
| 58 | −10.30 | −10.30 |
| 70 | (−10.40) | −10.40 |
| 77 | −10.29 | −10.24 |
| 85 | −9.56 | −9.56 |
| 96 | −10.29 | −10.39 |

FIG. 18

| INITIAL VALUE (VARIATION FROM 1/2) | △t = 2 | △t = 1 | △t = 0.5 |
|---|---|---|---|
| 0 0 0 0 | 0 1 1 0 | INTERNAL UNSTABLE POINT | INTERNAL UNSTABLE POINT |
| + 0 0 0 | 1 0 0 1 | 1 0 0 1 | INTERNAL UNSTABLE POINT |
| − 0 0 0 | 0 1 1 0 | 0 1 1 0 | INTERNAL UNSTABLE POINT |
| + + − − | 1 1 0 0 | 1 1 0 0 | INTERNAL UNSTABLE POINT |
| + − + − | 1 0 1 0 | 1 0 1 0 | INTERNAL UNSTABLE POINT |
| − + − + | 0 1 0 1 | 0 1 0 1 | INTERNAL UNSTABLE POINT |
| − − + + | 0 0 1 1 | 0 0 1 1 | INTERNAL UNSTABLE POINT |

5,533,168

DATA PROCESSING APPARATUS FOR OBTAINING OPTIMUM COMBINATION SOLUTION AND METHOD OF OBTAINING OPTIMUM COMBINATION SOLUTION

This application is a application of Ser. No. 07/952,668, filed Sep. 28, 1992, now abandoned, which application is a continuation of application Ser. No. 825,830, filed Jan. 28, 1992, now abandoned, which is a continuation of application Ser. No. 582,187, filed Sep. 26, 1990, now abandoned.

TECHNICAL FIELD

The present invention relates to an apparatus for and a method of data processing, and more specifically, the present invention is directed to a neurocomputer (neuronal net) suitable for solving an optimum combination problem.

BACKGROUND ART

Very recently, great progress has been made in developing a neuron computer. Both a Hopfield type and also a Rumelhart type are known as typical neurocomputers.

A neurocomputer is designed as a brain model of a human. For instance, several thousands of million of neurons (neurons cells) which own two states, i.e., under inert state when an input reaches a certain threshold value, and under active condition when the input exceeds this threshold value, are combined with each other for operation purposes, whereby this neurocomputer may process optimum combination problems and recognition which are not preferably processed by the presently available computers.

The previously described Hopfield type neurocomputer is suitable for solving the optimum combination problem. It should be noted that the optimum combination problem implies that combinations are obtained by which a certain condition of articles having such discrete values as "1" and "0" is minimized (or maximized). Since no generic method for solving this problem has been known in prior art, it is extremely difficult to solve a problem having a large scale.

To the contrary, in U.S. Pat. No. 4,660,166 and the like, Hopfield has disclosed that the traveling salesman problem which is the most difficult combination problem to be solved could be solved by the neuronal computation at a high velocity, and the solution close to the optimum solution could be obtained. It should be understood that "this traveling salesman problem" is to obtain the shortest traveling path routing n cities under such constraint that the salesman travels the respective cities only one time. With respect to n cities, there are combinations of $n!/2n = n(n-1) \cdots 2 \cdot \frac{1}{2}n$.

In accordance with Hopfield, n pieces of neurons correspond to each of n cities (accordingly, $n^2$ pieces of neurons are employed in total), and when the i-th neuron of the respective cities becomes active, it implies that the salesman visits this town at an i-th traveling sequence. The combinations between the respective neurons are determined under both constraint condition that he passes through the respective cities only once, and shortest distance condition. A summation of these conditions is defined as energy, and then operation of neurons is assumed that this energy becomes low in a lapse of time. As a result, when a proper value between the active state (1) and inactive state (0) is set to each neuron, the energy is lowered in a lapse of time, and the neuronal computation is stopped where the energy is locally minimized. "n" pieces of neurons are brought into active states among $n^2$ pieces of neurons so that the constraint conditions are satisfied and a solution close to the minimum distance can be obtained.

Now, the above-described contents will be described with employing an energy function. It is assumed that an energy value "E" is given as follows:

$$E = \frac{1}{2} x^t T x + b^t x \quad (1)$$

It should be noted that x, T and b indicate an n-dimensional variable vector, an nxn-dimensional coefficient matrix, and an n-dimensional input vector, respectively, and "t" indicates a symbol of transposition. Each of symbols is expressed by:

$$X = (X_1, \ldots, \ldots, X_n)^t$$

$$T = \begin{pmatrix} T_{11} \ldots T_{1n} \\ T_{n1} \ldots T_{nn} \end{pmatrix}$$

$$b = (b_1, \ldots, b_n)^t$$

Assuming now that "T" is a symmetric matrix, namely $T_{ij} = T_{ji}$. It has been described that this energy E is obtained as follows. That is, when "X" is equal to a value of "0" or "1", otherwise "−1" or "1", this X for minimizing E is calculated by solving the following differential equation:

$$\frac{du}{dt} = -Tx - b \quad (2)$$

$$x_i = \tan h \, u_i \text{ (in case of: } -1 \leq x_i \leq 1) \quad (3)$$

$$xi = (1 + \tan h \, u_i)/2 \text{ (in case of: } 0 \leq x_i \leq 1) \quad (4)$$

It should be understood that correspondence to a neuron is as follows. An output of i-th neuron among "n" pieces of neurons corresponds to Xi; an input corresponds to a constant input bi; an input from the i-th neuron corresponds to $T_{ij} X_j$; and also an output itself inputted thereto corresponds to $T_i X_i$. Accordingly, $T_{ij}$ indicates a strength of an input combination from a j-th neuron to an i-th neuron. In particular, $T_{ii}$ represents a strength of an input combination of the output for the i-th neuron supplied thereto.

Since, as the method for solving the large-scale optimum combination problems, no method with a better efficiency has been known, and thus a lengthy time is required so as to solve such large-scale problems, there could be simply obtained the solution near the optimum solution by solving the equation (2).

However, the solution obtained by way of the above-described conventional method corresponds to a minimal value, but not a minimum value. Although convergence characteristic thereof has been described to some extent in Technical Research Report by Electronic Information Communication Society, PRU 88-6 (1988), pages 7 to 14, no definite solution could be obtained. This implies such a trial and error condition that no clear answer is made on how to control the neurocomputer.

Furthermore, in general, there are some cases in which an inequality constraint is given in combination problems. However, the above-described prior art cannot be applied thereto.

DISCLOSURE OF THE INVENTION

An object of the present invention is to solve the above-described problems, and to provide a data processing apparatus and a method with employment of a neurocomputer capable of providing either a minimum value or a value close to this minimum value at high speed with respect to any types of problems.

1. The present invention is characterized by comprising: (i) a representation of an energy function; (ii) a decision on a weight; (iii) a selection for an initial value of an integral; (iv) an improvement in a converged solution; (v) an integral method; and also (vi) a solution converged into a boundary. Not only these independent means and methods own the features, but also various combinations thereof have the features.

An example of means for solving a problem will now be logically explained.

(i) Representation of Energy Function

Depending upon such a fact that a combination matter takes either two values of "−1" and "1" or two values of "0" and "1" it is determined whether the equations (2) and (3) are solved, or the equations (2) and (4) are solved. It may be understood that each of the differential equations owns such a characteristic that the energy is lowered in a lapse of time, and represents a physical phenomenon. It should be noted that after time has passed, it reaches "−1" and "1", or "0" and "1" which implies that these points correspond to stable points as defined by the physical phenomenon. First, a description will now be made of the stability on the extreme points of "−1" and "1" problem based upon the equations (2) and (3). When "u" is eliminated from the equations (2) and (3), it is given as follows:

$$\frac{dx}{dt} = \frac{dx}{cu}\frac{du}{dt} = -\begin{bmatrix} 1-x_1^2 & 0 \\ & \ddots & \\ 0 & & 1-x_n^2 \end{bmatrix}(Tx+b) \quad (5)$$

Accordingly, a singularity or singular point of the equation (5), namely a point where even when a time has lapsed, it stops if the initial value has been given thereto, becomes "X" for satisfying $Tx+b=0$ and also a solution for satisfying the above-described combined conditions under such condition that the right hand side of the equation (5) is selected to be zero;

$$Xi = \pm 1, i=1, \cdots, n.$$

Here, fixed values of $Ci = \pm 1$, $i=1, \cdots, n$ of an extreme point $C=(C_1, \cdots, C_n)$ on a hyper cube will now be calculated. The equation (5) is substituted by $X=y+c$:

$$\frac{dx}{dt} = \frac{dy}{dt} =$$

$$-\begin{bmatrix} \{1-(y_1+c_1)^2\} & 0 \\ & \ddots & \\ 0 & & \{1-(y_n+c_n)^2\} \end{bmatrix}\{T(y+c)+b\} =$$

$$\begin{bmatrix} y_1^2+2y_1c_1+c_1^2-1 & 0 \\ & \ddots & \\ 0 & & y_n^2+2y_nc_n+c_n^2-1 \end{bmatrix}\{T(y+c)+b\} =$$

$$\begin{bmatrix} c_1^2-1 & 0 \\ & \ddots & \\ 0 & & c_n^2-1 \end{bmatrix}Ty +$$

$$\begin{bmatrix} 2y_1c_1+c_1^2-1 & 0 \\ & \ddots & \\ 0 & & 2y_nc_n+c_n^2-1 \end{bmatrix}[Tc+b] +$$

$$\begin{bmatrix} y_1^2+2y_1c_1 & 0 \\ & \ddots & \\ 0 & & y_n^2+2y_nc_n \end{bmatrix}Ty +$$

$$\begin{bmatrix} y_1^2 & 0 \\ & \ddots & \\ 0 & & y_n^2 \end{bmatrix}(Tc+b)$$

Since $c_i^2=1$ is on the extreme point, only a linear term is taken out from the above-mentioned formula:

$$\frac{dy}{dt} = \begin{bmatrix} 2y_1c_1(T_1c+b_1) & 0 \\ & \ddots & \\ 0 & & 2y_nc_n(T_nc+b_n) \end{bmatrix} \quad (6)$$

$$= \begin{bmatrix} 2c_1(T_1c+b_1) & 0 \\ & \ddots & \\ 0 & & 2c_n(T_nc+bn) \end{bmatrix} y,$$

where $$T_i=(T_{i1} \cdots T_{in})$$

$$T_n=(T_{n1} \cdots T_{nn})$$

As a result, the fixed value $\lambda_{c,i}$ of the extreme point C is expressed by:

$$\lambda_{c,i} = 2c_i(T_ic+b_i) \quad \ldots (7)$$

$$i=1, \ldots, n$$

when the extreme point C is equal to $\lambda_{c,i} < 0$ ($i=1, \cdots, n$), it is stable and converges into this point from the adjacent initial value.

Thereafter, as to the "0", "1" problem for the equations (2) and (4), fixed values are obtained. In contrast with the former case, the equation (2) is set as follows:

$$\frac{du}{dt} = -Sx+a \quad (8)$$

If this equation is substituted by the equation (4), it is given:

$$\frac{dx}{dt} = -\begin{bmatrix} 2x_1(1-x_1) & 0 \\ & \ddots & \\ 0 & & 2x_n(1-x_n) \end{bmatrix}(Sx+a) \quad (9)$$

Assuming now that the extreme points on the hyper-cube are $d=(d_1, \cdots, d_n)$, $d_i=1, 0$, $i=1, \cdots, n$, when formula (a) is substituted by $x=y+d$, it is given as follows:

$$\frac{dy}{dt} =$$

$$-2\begin{bmatrix} -y_1^2+(1-2d_1)y_1+d_1(1-d_1) & 0 \\ & \ddots & \\ 0 & & -y_n^2+(1-2d_n)y_n+d_n(1-d_n) \end{bmatrix}\{S(y+d)+a\}$$

When the above-described formula is linearized, while paying an attention to $di(1-di)=0$, it becomes:

$$\frac{dy}{dt} = 2\begin{bmatrix} (2d_1-1)(S_1d+a_1) & 0 \\ & \ddots & \\ 0 & & (2d_n-1)(S_nd+a_n) \end{bmatrix}y \quad (10)$$

As a consequence, the fixed value $\lambda_{d,i}$ of the extreme point "d" is expressed by:

$$\lambda_{d,i} = 2(d_i-1)(S_id+a_i) \quad i=1, \ldots, n \quad (11)$$

It should be noted that $$S_i=(S_{i1}, \cdots, S_{in}).$$

The extreme point "d" becomes stable when $\lambda_{d,i} < 0$ (i=1, - - - , n).

Now, to investigate a relationship between the "0", "1" problem and "−1", "1" problem, the following equation (12) is substituted for "x" of the equation (5):

$$x = 2y - 1 \quad 1 = (1, \ldots, 1)^t \tag{12}$$

(the equation (5) becomes "0", "1" problem from "−1", "1" problem by this conversion) Then, it is obtained as follows:

$$2\frac{dy}{dt} = -\begin{bmatrix} 4y_1(1-y_1) & & 0 \\ & \ddots & \\ 0 & & 4y_1(1-y_n) \end{bmatrix} [2Ty - T1 + b]$$

Therefore $$\frac{dy}{dt} = -\begin{bmatrix} 2y_1(1-y_1) & & 0 \\ & \ddots & \\ 0 & & 2y_n(1-y_n) \end{bmatrix} [2Ty - T1 + 2b] \tag{13}$$

The fixed value of the extreme point "d" in the formula (13) is given based upon the equation (11):

$$\lambda_{d,i} = 2(2d_i - 1)(2T_id - T_i1 + b_1) \quad i=1, \ldots, n \tag{14}$$

The extreme point "c" in the equation (5) with respect to the extreme "d" is given by:

$$c = 2d = 1$$

Accordingly, when it is substituted for the formula (14), it becomes $\lambda_{c,i} = 2c_i(T_{ic} + b_i)$ i=1, - - - , n. This is coincident with the equation (7). As a consequence, even when the "−1", "1" problem is converted into "0", "1" problem based upon the formula (12), there is no change in the fixed value, and therefore the stable extreme points remain in a stable condition.

Next, a relationship between the fixed value and energy will now be made clear.

It should be noted that with respect to the extreme point c(d), an extreme point c(i) (d(i)) is defined as follows.

$$c(i) = (c_1, \ldots, c_{i-1}, -c_i, c_{i+1}, \ldots c_n)$$

$$d(i) = (d_1, \ldots, d_{i-1}, (1-d_i), d_{i+1}, \ldots d_n)$$

That is to say, c(i) and d(i) are extreme points adjoining "c" and "d". At this time, there exists the following relationship between the adjoining extreme point c, c(i), or the energy Ec, Ec(i), or Ed, Ed(i) for the extreme points d, d(i), and the fixed point:

$$E_c - E_{c(i)} = \frac{1}{2}(\lambda_{c,i} - \lambda_{c(i),i}) \tag{15}$$

$$E_d - E_{d(i)} = \frac{1}{4}(\lambda_{d,i} - \lambda_{d(i),i})$$

This may be understood as follows.

$$\begin{aligned}
E_c - E_{c(i)} &= \frac{1}{2} c^t Tc + b^t c - \frac{1}{2} c(i)^t Tc_{(i)} + b^t c_{(i)} \\
&= \frac{1}{2} c^t Tc \frac{1}{2} c^t Tc_{(i)} + \frac{1}{2} c^t Tc_{(i)} - \frac{1}{2} c_{(i)}^t Tc_{(i)} + 2b_i c_i \\
&= c_i T_i c + c_i T_i c_{(i)} + 2b_i c_i
\end{aligned}$$

(utilizing "T" being symmetry)

$$= 2c_i T_i \begin{pmatrix} c_1 \\ \cdot \\ \cdot \\ 0 \\ \cdot \\ \cdot \\ c_n \end{pmatrix} + 2b_i c_i = \frac{1}{2}(\lambda_{c,i} - \lambda_{c(i),i})$$

Also, $$\begin{aligned}
E_d - E_{d(i)} &= \frac{1}{2} d^t Sd + a^t d - \frac{1}{2} d_{(i)}^t Sd_{(i)} - a^t d_{(i)} \\
&= \frac{1}{2}(2d_i - 1)S_i d + \frac{1}{2}(2d_i - 1)S_i d_{(i)} + (2d_i - 1)a_i \\
&= (2d_i - 1)\left\{ S_i \begin{pmatrix} d_1 \\ \cdot \\ 1/2 \\ \cdot \\ d_n \end{pmatrix} + a_i \right\} \\
&= \frac{1}{4}(\lambda_{d,i} - \lambda_{d(i),(i)})
\end{aligned}$$

The relationship of the formula (15) implies that when the energy is lower than the adjoining point, the value of the corresponding fixed value is also small.

Furthermore, assuming now that $T_{ii} = 0$ (i=1, - - - ,n), the extreme point "c" or "d" where $$E_c < E_{c(i)} \quad i=1, \ldots, n \tag{16}$$

otherwise Ed>Ed(i) becomes the stable point for the differential equation (5) or (9).

This becomes $\lambda_{c,i} = -\lambda_{c(i),i}$ based upon both $T_{1i} = 0$ and $$\lambda_{c,i} = 2c_i \left( T_i \begin{pmatrix} c_1 \\ \cdot \\ \cdot \\ c_n \end{pmatrix} + b_i \right)$$

$$\lambda_{c(i),i} = -2c_i \left( T_i \begin{pmatrix} c_1 \\ -c_i \\ c_n \end{pmatrix} + b_i \right)$$

Also, since $\lambda_{c,i} < \lambda_{c,(i),i}$ based on the formula (15), it becomes:

$$\lambda_{c,i} < 0 \quad i=1, \ldots, n \tag{17}$$

As a result, the extreme point "c" corresponds to the stable point.

Then, it becomes $\lambda_{d,i} = -\lambda_{d(i),i}$ based upon both $T_{ii}=0$ and $$\lambda_{d,i} = 2(2d_i - 1)\left(S_i\begin{pmatrix}d_1\\ \cdot\\ \cdot\\ \cdot\\ d_n\end{pmatrix} + a_i\right)$$

$$\lambda_{d(i),i} = -2(2d_i - 1)\left(S_i\left(1 - \frac{d_1}{d_n}\,d_i\right) + a_i\right)$$

since $\lambda_{d,i}\lambda_{d(i),i}$ from the formula (15), it follows:

$$\lambda_{d,i} < 0 \quad i=1, \ldots, n \tag{18}$$

This represents that if $T_{ii}=0$, then all of the extreme points having the lower energy than that of the adjoining extreme points become the stable points, and when the initial values are given to an adjacent area thereof, they can be obtained as the solution of the differential equation. In other words, to make all of the minimul values stable, it can be found that if $T_{ii}=0$, then this is achieved. It should be noted that as to the $-1, 1$ problem, there is no problem because the energy value of the respective extreme points is uniformly increased or decreased even when the value of $T_{ii}$ is set to zero. However, as to the 0, 1 problem, the energy value is changed at a point of "1", whereas it is not varied at a point of "0". To this end, it is required with respect to the 0, 1 problem that the value of $\frac{1}{2} T_{ii}$ is added to bi and also $T_{ii}$ is set to zero.

(ii) Decision on Weight

When the energy function is minimized, it is required to minimize the evaluation function under a certain constraint condition. As this example, the traveling salesman problem will now be considered as disclosed in the above-described U.S. Pat. No. 4,660,166. The traveling salesman problem implies such a problem that traveling distances over "n" pieces of towns are minimized under such a condition so as to visit one town only once among n pieces of towns. With respect to a town "X" it owns a vector $V_{xi}(i=1, ---, n)$, and it is represented that when $X_{xi}$ is equal to 1, the town X is visited at the i-th visit. The energy function of this case will be defined as follows:

$$E = A/2 \sum_x \left(\sum_i V_{xi} - 1\right)^2 + \tag{19}$$

$$B/2 \sum_i \left(\sum_y V_{yi} - 1\right)^2 +$$

$$D/2 \sum_X \sum_{Y \neq X} \sum_i d_{xy} V_{xi}(V_{y,i+1} + V_{y,i-1})$$

The first term of the equation (19) is such a condition that only one visit is paid for a single term, and the second term thereof is such a condition that a visit is paid only once for a single town. "$d_{xy}$" of the third term indicates a distance between a town "x" and a town "y", and corresponds to an evaluation function for calculating a travel distance. It should be noted that A, B and D correspond to weights. As there is no clear way how to determine this weight, the weight has been determined by way of the trial and error method in prior art.

Here, when there are plural constraint conditions, in order to effectively satisfy all of these constraint conditions, if the weights are determined for making effective only a specific constraint condition, there are possibilities that a solution which cannot satisfy the constraint conditions is obtained. Similarly, to equally satisfy the respective constraint conditions, the weights may be determined in such a manner that when the solution is deviated from the constraint condition, increases in the values of these constraint conditions are equal to each other. In the first and second terms of the equation (19), assuming now that as to a certain X in the first term, either $V_{xi}=V_{xy}=1$, $i \neq j$, values other than the above values are equal to zero, then the constraint condition of the first term becomes A/2. Similarly, assuming now that as to a certain i in the second term, if $V_{yi}=0$, all of y or $V_{yi}=V_{zi}=1$, $J \neq Z$, values other than the above values are equal to zero, then the constraint condition becomes B/2. As a consequence, if $A=B$ - - - (20), then the effect caused by the constraint condition of the first term may be equal to that of the second term.

Subsequently, with respect to the allocation of weight between the constraint condition and evaluation function, if the increased value of the constraint conditions which is caused by deviating the constraint conditions is selected to be greater than the decreased value of the evaluation function which is caused by not satisfying the constraint condition, there is no possibility to obtain such a solution deviated from the constraint conditions. As to the weights of the first, second and third terms in the equation (19), it is assumed that one of the weights becomes "0" from "1" based upon the solution in which both the first and second terms have satisfied the constraint conditions. Since the first and second terms correspond to A=B at this time, they are increased by:

$$A/2+B/2=A \quad - - - \tag{21}$$

To the contrary, since in the second term, two routes are lost and calculations are made on distances for both x and y, only the following amount is reduced:

$$2(D/2 \times 2_{max}\, d_{xy}) = 2D_{max}\, d_{xy} \tag{22}$$
$$\phantom{2(D/2 \times 2_{max}\, d_{xy}) = }x,y \phantom{= 2D_{max}\, d_{x}}x,y$$

Accordingly, in order that the value for the quantity of visiting towns is not equal to the optimum solution, it may be understood that the below-mentioned condition is satisfied:

$$A > 2D_{max}\, d_{xy} \tag{23}$$
$$\phantom{A > 2D_{max}\, d}xy$$

The reason why a decision can be made of only one weight as "0" from "1" with respect to the solution for satisfying such constraint conditions, is that the solution obtained as represented in (i) has the lower energy than that of the adjacent solution, which is theoretically proved.

(iii) Selection for Initial Value of Integral Calculation

In case that an optimum combination problem, or a problem on combination optimization is obtained by an integral calculation, it is very important to select an initial value of a variable "x" so as to obtain an optimum solution among a large quantity of stable points.

It may be stated that when either a root of $T_x+b=0(-1 \leq x_i \leq 1)$, or a root of $Sy+a=0(0 \leq xy_i \leq 1)$, namely a singular point is not present with regions of x and y, no more than two discrete minimum points exists, and therefore it converges into a minimum value from a certain point within the regions. However, such a case is out of question in view of a practical problem.

Assuming now that a singular point or singularity exists within a region and there is a stable point on an extreme point (this condition is satisfied if $T_{ii}=0$, $i=1$, - - - , n), it is possible to indicate that this singular point becomes unstable. Accordingly, if an initial value is set around this singular point, convergence to a stable extreme point can be guaranteed. However, there are also some possibilities to obtain a solution far from an optimum solution since paths from this singular point to all stable points are present. In the above-described technical Research Report on Electronic Information Communication Society, if the initial value is selected to be near the limit as close as possible, then it has been experimentally indicated that the minimum value may be obtained. However, there is no clear description how to set the initial value close to the limit.

Now, let consider as to the "1", "0" problem and also "1", "−1" problem, effects achieved when the initial value of the variable is set to a center point within a variation range thereof. It should be noted that the center point means "½" in the "1", "0" problem, and "0" in the "1", "−1" problem. Now, let consider such a simple model:

$$E = \frac{1}{2}(x,y)\begin{pmatrix} 0 & 1 \\ 1 & 0 \end{pmatrix}\begin{pmatrix} x \\ y \end{pmatrix} + (b_1, b_2)\begin{pmatrix} x \\ y \end{pmatrix} \quad (24)$$

$$\begin{bmatrix} \frac{dx}{dt} \\ \frac{dy}{dt} \end{bmatrix} = -\begin{pmatrix} 1-x^2 & 0 \\ 0 & 1-y^2 \end{pmatrix}\left\{\begin{pmatrix} 0 & 1 \\ 1 & 0 \end{pmatrix}\begin{pmatrix} x \\ y \end{pmatrix} + (b_1, b_2)\right\}$$

$$-1 \leq x \leq 1, -1 \leq y \leq 1$$

At this time, a case where the singular point is present within the region corresponds to such a case: $|b_1|<1$, $|b_2|<1$. Then, if $b_1=b_2$, the singular point $S=(-b_1, -b_2)=(-b_1, -b_1)$, and the fixed values for the respective extreme points are given as follows:

```
(1, 1)    2(1 × b_1) > 0.2(1 + b_1) > 0    unstable
(1, −1)   2(−1 + b_1) < 0, −2(1 + b_1) < 0  stable
(−1, 1)   −2(1 + b_1) < 0, 2(−1 + b_1) < 0  stable
(−1, −1)  2(1 − b_1) > 0, 2(1 − b_1) > 0   unstable
```

As a result, both $(1, −1)$ and $(−1, 1)$ are stable, the energy values of both cases are equal to each other, and the solution may converge into either case. In FIG. 2, there is shown a movement of a solution under condition that when $b_1=b_2=\frac{1}{2}$, an initial value is given near an origin. When the initial value is given to the origin, then the solution will converge into the singular point $S=(-\frac{1}{2}, -\frac{1}{2})$. When the initial value is set in such a manner: $y>x$, the solution will converge into a point $(-1, 1)$. If $y<x$, then it will converge into a point $(1, -1)$.

Similarly, if $|b_1|<1$, $|b_2|<1$, $b_1 \neq b_2$, $(1, -1)$ becomes the minimum value when $b_1 < b_2$, whereas $(-1, 1)$ becomes the minimum value when $b_1 > b_2$. FIG. 3 represents a movement of a solution around an origin when $b_1 = \frac{1}{4}$, $b_2 = \frac{1}{2}$. At this time, $(1, -1)$ becomes a minimum value. When an initial value is given to an origin, the solution will converge into a stable point.

As to the "1", "0" problem, since it may be possible to convert the formula (12) into the "1", "−1" problem, a point of ½ corresponds to the origin of "1", "−1" problem.

In the above-described example, when there is only one minimum value, the initial value region converging into the minimum value represents that it involves the center point within the variation range of the variable, and therefore the center point may be selected as the initial point. To the contrary, when there are a plurality of minimum values, there is a case that even when it starts from the center point, it cannot reach the extreme point. In such a case, the initial value may be set to a value slightly shifted from the value of the center point.

Here, as to the "1", "0" problem, it is set as follows:

$$N_1 {}^U N_2 {}^U \ldots {}^U N_m = (1, 2, \ldots, n) \text{ and also}$$
$$N_1 N_2 \ldots n_m = \phi$$

Note that "U" indicates calculations of summation and product for a set, and $\phi$ represents an empty set. At this time, with respect to i, j(i=j) contained in $N_1(1=1, ---, m)$, it will take $\omega(0)$ which becomes:

$$\left|\left(\frac{1}{2}SI + a\right)i\right| = \left|\left(\frac{1}{2}SI + a\right)j\right|$$

and also $$|\omega(0)_i| = |\omega(0)_j|,$$
$$|S\omega(0)_i| = |S\omega(0)_j|$$

Each of symbols for $\omega(0)i$, $(S \omega(0))j$, and $(\frac{1}{2}SI+b)j$ corresponding to $\omega(o)i$, $(s\omega(0))i$, and $(\frac{1}{2}SI+b)i$ is equal to each other or opposite to each other. It should be noted that "I" is an n-dimensional vector and corresponds to:

$$I = (1, ---, 1)^t$$

In this case, when the initial value is selected to $x(0)=\omega(0)+\frac{1}{2}I$, the system is reduced from the n dimension to the m dimension. Even when the singular point for satisfying $Tx+b=0$ of the original system becomes unstable, there may be such a case that the singular point corresponding to the reduced system becomes stable. Therefore, in this initial value, the solution will converge into this singular point.

This may be understood as follows. When $X=\omega+\frac{1}{2}I$ is substituted for the equation (9), it obtains:

$$\frac{d\omega}{dt} = -\begin{bmatrix} 2\left(\frac{1}{2}-\omega_1\right) & \left(\frac{1}{2}+\omega_1\right) & 0 \\ & & \\ 0 & 2\left(\frac{1}{2}-\omega_n\right) & \left(\frac{1}{2}+\omega_n\right) \end{bmatrix}\left(S\omega + \frac{1}{2}SI + a\right)$$

If $\omega=\omega(0)$, then the absolute values of all $\omega_i$ corresponding to "i" involved into "$N_1$" based on the assumption are varied in a completely same manner after $t>0$. That is to say, the movement of "$\omega_i$" with respect to "i" involved in "$N_1$" may be represented as one movement of "$\omega_j$". As a result, the system of "n" variables is reduced to the system of "m" variables. Under such a circumstance, if $N_1$ is set to a representative of "i" involved in $N_1$ with the differential equation of the reduced system, a coefficient $S_{ii'}$ of this system is expressed as follows:

$$S_{ii}' = S_{ii} + \sum_{j \in N_l} T_{ij} - \sum_{j \in N_l} T_{ij}$$

$$\omega_i = \omega_j \quad \omega_i = -\omega_j$$

Note: $N_1$ indicates that "j" is involved into $N_1$. As a consequence, there is such a case that $S_{ii'}>0$ in the reduced system, and thus there is another case that the extreme point becomes unstable and the internal singular point becomes stable (will be discussed later). At this time, when $X(0) = \omega(0)+\frac{1}{2}I$ is set as the initial value, the solution will converge into the internal singular point.

Similarly, as to the "1", "−1" problem, with respect to i, j, $N_1$, it takes $\omega(0)$ which becomes:

$|b_i|=|b_j|$ and also $|\omega(0)_i| = |\omega(0)_j|$,
$|(T\omega(0))_i| = |(T\omega(0))_j|$ When the symbols corresponding to $\omega(0)j$, $(T\omega(0))j$, bj which corresponds to $\omega(0)i$, $(T\omega(0))i$, bi are equal to each other, or opposite to each other, and then the initial value is selected to $X(0)=\omega(0)$, there is a case that the solution converges into the internal singular point.

To avoid the above-described reduction, when there exists a possibility of reduction, with respect to either a minimum limit or $N_l(l=1, ---, s)$, it is necessary to set $|\omega(0)|i \neq |\omega(0)|j$ for i, j which becomes i, j $N_l$. For more confirmly setting, it may be selected as follows:

$|\omega(0)|_i \neq |\omega(0)|_j, i \neq j, i, j \in N_l, l=1, \ldots, s$ alternately, $|\omega(0)|_i \neq |\omega(0)|_j, i \neq j, i, j=1, \ldots, n$ (iv) Improvement in Converged Solution Even if an initial value is given to a central point, there is no guarantee that a solution converges into a minimum value. As a consequence, when the solution is obtained, it is necessary to improve the solution by checking whether or not there exists another solution the energy value of which is further decreased.

It should be noted that the "1", "−1" problem owns the following characteristics. That is to say, when the value of $T_{ij}$ is increased by $\alpha$, the energy of the respective extreme points "c" is increased by $\alpha$, and the fixed value $\lambda_{c,i}$ is similarly increased by $2\alpha$.

This could be understood from the below-mentioned description. The energy related to $T_{ii}$ is equal to $\frac{1}{2}X_i^2 T_{i1}$ based on the equation (1), so that if the value of $T_{i1}$ is increased by $\alpha$, then the energy is increased by $\alpha/2$ at the extreme point.

Since $$\begin{aligned}\lambda_{c,i} &= 2c_i(T_i c + b_i) \\ &= 2c_i \left( T_{i1} c_i + \sum_{j \neq i} T_{ij} c_j + b_i \right) \\ &= 2T_{i1} + 2c_i \sum_{j \neq i} (T_{ij} c_j + b_i)\end{aligned}$$

the fixed value $\lambda_{c,i}$ is increased by $2\alpha$.

With respect to the "0", "1" problem, there is the below-mentioned characteristic.

Although there is no change in the energy of the respective extreme point under such a condition that the value of $S_{ii}$ is increased by $\alpha$ and the value of $a_i$ is decreased by $\alpha/2$, the fixed value $\alpha_{d,i}$ of the extreme point "d" is increased by $\alpha$.

This may be understood as follows.

The energy for $S_{i1}$, $a_i$ is given as follows from the equation (1):

$$\frac{1}{2} S_{i1} x_i^2 + a_i x_i$$

Accordingly, when $S_{i1}$ is increased by $\alpha$, and $a_i$ is decreased by $\alpha/2$, it becomes:

$$= \frac{1}{2} (S_{i1} + \alpha) x_i^2 + \left( a_i - \frac{\alpha}{2} \right) x_i \quad (26)$$

$$= \frac{1}{2} S_{i1} x_i^2 + a_i x_i + \frac{\alpha}{2} x_i(x_i - 1)$$

$$\frac{1}{2} S_{i1} x_i^2 + a_i x_i \, (x_i = 0, \text{ or } 1)$$

Further, as the fixed value $\lambda_{d,i}$ is given by:

$$\begin{aligned}\lambda_{d,i} &= 2(d_i - 1)(S_i d + a_i) \quad (27) \\ &= 2(d_i - 1)\left( S_{i1} d_i + a_i + \sum_{j \neq i} S_{ij} d_j \right)\end{aligned}$$

when $S_{i1}$ is increased by $\alpha$ and $a_i$ is decreased by $\alpha/2$, the fixed value becomes:

$$\begin{aligned}\lambda_{d,i}' &= 2(2d_i - 1)\left( \alpha d_i - \frac{\alpha}{2} \right) + \lambda_{d,i} \quad (28) \\ &= \alpha(2d_i - 1)^2 + \lambda_{d,i} \\ &= \alpha + \lambda_{d,i}\end{aligned}$$

Consequently, if the body element of "T" or "S", is increased with maintaining the above-described condition, it can be found that the stable point is made unstable.

Also, when the obtained solution is not equal to the minimum value, there is the following relationship between another solution having lower energy than that of the obtained solution and the fixed value.

In the "1", "0" problem, a difference in the energy $E_e$ and $E_f$ is expressed from the fixed value:

$$E_e = E_f = \frac{1}{4} \sum_{i \in S} (\lambda_{e,i} - \lambda_{f,i}) \quad (29)$$
$$S = \{i | i = 1, \ldots, n, e_i \neq f_i\}$$

In accordance with the equation (29), when the "1", "−1" problem is concerned, the coefficient of the right-hand side thereof becomes ½. This implies that it can be satisfied with respect to the "0", "1" problem Assuming now that:

$e=(e_1, \ldots, e_i, e_{i+1}, \ldots e_n)^t$ $f=((1-e_1), \ldots, (1-e_i), e_{i+1}, \ldots e_n)^t$ it becomes:

$$E_e - E_f = \frac{1}{2} e^t S e - \frac{1}{2} f^t S f + \quad (30)$$

$$a^t e - a^t f = \frac{1}{2} e^t S e - \frac{1}{2} e^t S f + \frac{1}{2} e^t S f - \frac{1}{2} f^t S f +$$

$$a^t \begin{pmatrix} 2e_1 - 1 \\ \cdot \\ \cdot \\ 2e_i - 1 \\ 0 \end{pmatrix} = \frac{1}{2} e^t S \begin{pmatrix} 2e_1 - 1 \\ \cdot \\ \cdot \\ 2e_i - 1 \\ 0 \end{pmatrix} +$$

$$\frac{1}{2} f^t S \begin{pmatrix} 2e_1 - 1 \\ \cdot \\ \cdot \\ 2e_i - 1 \\ 0 \end{pmatrix} + a^t \begin{pmatrix} 2e_1 - 1 \\ \cdot \\ \cdot \\ 2e_i - 1 \\ 0 \end{pmatrix} =$$

$$(2e_1 - 1, \ldots, 2e_i - 1, 0 \ldots 0) \left\{ S \begin{pmatrix} 1/2 \\ \cdot \\ \cdot \\ 1/2 \\ e_{i+1} \\ \cdot \\ \cdot \\ e_n \end{pmatrix} a \right\}$$

On the other hand, $$\sum_{j=1}^{i} (\lambda_{e,j} - \lambda_{f,j}) = 2 \sum_{j=1}^{i} \{(2e_i - 1)(S_i e + a_i) - \quad (31)$$

$$(2f_i - 1)(S_i f + a_i)\} =$$

$$4 \sum_{j=1}^{i} (2e_i - 1) \left\{ S_i \begin{pmatrix} 1/2 \\ \cdot \\ \cdot \\ 1/2 \\ e_{i+1} \\ e_n \end{pmatrix} + a_i \right\}$$

Consequently, it can be understood that the equation (29) is satisfied.

Assuming now that when the extreme point "f" is obtained by performing the integral calculation, there exists the extreme point "e" having the lower energy than that of the extreme point "f", based upon the equation (29), $$\sum_{i \in s} \lambda_{e,i} < \sum_{i \in s} \lambda_{f,i} \quad (32)$$

and also since the fixed values with respect to $\lambda_{e,i}$ and $\lambda_{f,i}$ are negative or zero, there is "i" among "i" involved in "S" in which the following relation is satisfied:

$$\lambda_{e,i} < \lambda_{f,i} \quad (33)$$

As a consequence, when a certain extreme point is obtained by way of the integral calculation, with respect to "i" in which the formula (33) is satisfied, the value of $T_{ii}(S_{ii})$ is increased, so that it can be set to:

$$\lambda_{e,i} < 0 < \lambda_{f,i} \quad (34)$$

As a result, since the extreme point "f" becomes unstable, there can be obtained the extreme point "e". At this time, since "i" for satisfying the formula (33) cannot be previously known, there have been proposed several methods.

The following methods may be conceived.

① A selection is made of a fixed value having a smaller absolute value, and a diagonal element of the corresponding T (or S) is increased.

② A diagonal element of T (or S) corresponding to such an element where 1 is satisfied among the obtained solutions is increased.

③ A selection is made of a fixed value having a smaller absolute value, and an element of the corresponding initial value is increased (otherwise decreased).

④ An element of an initial value corresponding to such an element where 1 is satisfied among the obtained solutions is increased (otherwise decreased).

In ③ and ④, the corresponding initial values are varied instead of an increase in the diagonal element, which causes the same advantage.

(v) Integral Method

When either the equations (2) and (3), or (2) and (4) are integrated by way of the digital method, they become as follows:

$$u_{new} = u_{old} - (Tx_{old} + b)\Delta t \quad (35)$$

$$x_{new} = f(u_{new}) \quad (36)$$

It should be noted that $U_{new}$, $U_{old}$, $X_{new}$, and $X_{old}$ correspond to U and X vectors after and before a time unit $\Delta t$; and "f" corresponds to the function of the equation (3) or (4). Now, since there exists such a characteristic that the energy is decreased in lapse of time, it can be confirmed whether or not a width $\Delta T$ of the time unit has been properly selected. That is to say, it can be detected that the time unit $\Delta t$ becomes too large when it becomes:

$$E_{xnew} > E_{xold} \quad (37)$$

Also, it can be understood there is a possibility the time unit $\Delta t$ may be large when it becomes:

$$E_{xnew} < E_{xold} \quad (38)$$

Thus, as previously described, the time unit of the integral may be properly set by monitoring the energy values.

It should be noted that since with respect to the "1", "0" problem, the initial value is present near $\frac{1}{2}I$, whereas the initial value is located around the origin as to the "1", "−1" problem, the following is given:

$$U_{new} = -\left(\frac{1}{2} TI + b\right) \Delta t$$

or $$U_{new} = -b\Delta t$$

There are some possibilities to obtain an unstable solution, since $\Delta t$ is set to be large, the absolute value of $U_{new}$ becomes great, and the value of tan h contained in "f" of the formula (36) becomes "1" or "−1". As a consequence, there may be obtain $\Delta t$ in such a manner that $$\max_i \left| \left(\frac{1}{2} TI + b\right)_i \right| \Delta t < U_{max} \quad (39)$$

or $$\max|b_i|\Delta t < U_{max} \quad (40)$$

(vi) Solution converged into Boundary

When a diagonal element of a matrix T (s) is not equal to zero, there is a case that a solution converges into a point on a boundary other than an extreme point. In this case, the following characteristic exists.

When energy of extreme points c, c(i) is equal to:

$$E_c < E_{c(i)} \quad (41)$$

a singular point is present between a center point of c and c(i), and c if $T_{i1} > 0$ and further $\lambda_{c,i} > 0$.

This may be found as follows. Since the same process can be expected in either case, the following discussion considers the "1", "−1" problem Based upon the formula (41) and condition it becomes:

$$\lambda_{c(i),i} > \lambda_{c,i} > 0 \quad (42)$$

At this time, the differential equation of the formula (3) with regard to $(c_1, \text{---}, c_{i-1}, Y_i, c_{i+1}, \text{---}, c_n)$ is given by:

$$\frac{dy_i}{dt} = -(1-y_i^2)T_i \begin{pmatrix} c_1 \\ \vdots \\ y_i \\ \vdots \\ c_n \end{pmatrix} + b_i$$

Thus, a singular point is expressed as follows:

$$y_i = \pm 1 \quad (43)$$

and $$T_{i1}y_i = -\left(\sum_{j=1}^{} T_{ij}c_i + b_i\right)$$

Here, it is obtained from the formula (40):

$$0 < 2(T_{i1} - T_{i1}c_iy_i) < 2(T_{i1} - T_{i1}c_iy_i)$$

Accordingly, under $T_{i1} > T_{i1c_iy_i} > 0$, it becomes $1 > c_iy_i > 0$ from $T_{i1} > 0$. As a consequence, it could be found that $y_i$ has the same symbol as that of $c_i$, and the singular point is present between the center point and c.

In accordance with the above-described characteristics, when the point on the boundary other than the extreme point of $T_{ii} > 0$ is obtained, if the extreme point near this boundary point is employed, it can be understood that the solution having the low energy is obtained. When $E_{(c)} = E_{c(i)}$, there are possibilities that all of points on the line connecting (c) and c(i) become stable points. In this case, any of numerous solutions may be employed.

2. Neurocomputer's Model In Case of Inequality Constraint

Assuming now that d>0 either $$d \geq \sum_{i=1}^{n} v_i x_i \quad (50)$$

or $$\sum_{i=1}^{n} v_i x_i \geq d \quad (51)$$

may be operated as inequality constraint. To achieve equalization, a variable y is introduced into the formula (50) so as to obtain as follows:

$$dy - \sum_{i=1}^{n} v_i x_i = 0, \; 1 \geq y \geq 0 \quad (52)$$

Also, the variable y is introduced into the formula (51) in order to obtain as follows:

$$dy - \sum_{i=1}^{n} v_i x_i = 0 \quad y \geq 1 \quad (53)$$

The optimum combination problem, or combination optimization involving the inequality constraint is defined as follows:

$$E' = \frac{1}{2}x^t T'x + b^t x \rightarrow \text{minimize} \quad (54)$$

inequality constraint $$dy_i - \sum_{j=1}^{n} v_{ij}x_j = 0, \; 1 \geq y_i \geq 0 \text{ or } y_i \geq 1 \quad (55)$$

$$(i = 1, \ldots, k)$$

It should be noted that when the equation (55) is squared and thereafter multiplied by ½, and the resultant equation is added to another equation (54), the energy E is given as follows:

$$E = E' + \frac{1}{2} \sum_{i=1}^{k} \left( d_i y_i - \sum_{j=1}^{n} v_{ij}x_j \right)^2 \quad (56)$$

$$= \frac{1}{2}(x,y)^t \begin{pmatrix} T & V \\ V^t & D \end{pmatrix} \begin{pmatrix} x \\ y \end{pmatrix} + b^t x$$

where:

$$T = T' + W$$

$$W = \begin{bmatrix} \sum_{i=1}^{k} v_{i1}^2 & \sum_{i=1}^{k} v_{i1}v_{i2} & \cdots & \sum_{i=1}^{k} v_{i1}v_{in} \\ \vdots & & \ddots & \vdots \\ \sum_{i=1}^{n} v_{i1}v_{in} & \cdots & \cdots & \sum_{i=1}^{k} v_{in}^2 \end{bmatrix}$$

$$D = \begin{bmatrix} d_1^2 & & 0 \\ & \ddots & \\ 0 & & d_k^2 \end{bmatrix}$$

$$V = -\begin{bmatrix} d_1v_{i1} & \cdots & d_kv_{ki} \\ d_1v_{in} & \cdots & d_kv_{kn} \end{bmatrix}$$

The neuronal model for the equation (56) is obtained as follows, assuming that $$x_i = 1/2(1 + \tan h \; u_i) \quad (57)$$

$$y_i = \begin{cases} 1/2(1 + \tan h \; v_i) & 1 \geq y_i \geq 0 \\ 1 + e^{v_i} & y_i \geq 1 \end{cases}, \quad (58)$$

$$\begin{bmatrix} \frac{du}{dt} \\ \frac{dv}{dt} \end{bmatrix} = -\begin{bmatrix} T & V \\ V^t & D \end{bmatrix} \begin{bmatrix} x \\ y \end{bmatrix} - \begin{bmatrix} b \\ 0 \end{bmatrix} \quad (59)$$

As a result, in case that the inequality constraint is present, the equations (57) to (59) may be solved based on a certain initial value.

(ii) Decision on Weight in Energy

If u, v are eliminated from the equations (57) to (59), it is given as follows:

$$\begin{bmatrix} \frac{dx}{dt} \\ \frac{dx}{dt} \end{bmatrix} = -\begin{bmatrix} 2(1-x_1)x_i & & 0 \\ & 2(1-x_n)x_n & \\ & f(y_1) & \\ 0 & & \ddots \\ & & f(y_k) \end{bmatrix} \left\{ \begin{bmatrix} T & V \\ V^t & D \end{bmatrix} \begin{bmatrix} x \\ y \end{bmatrix} + \begin{bmatrix} b \\ 0 \end{bmatrix} \right\} \quad (60)$$

where:

$$f(y_i) = 2(1-y_i)y_i, \; 1 \geq y_i \geq 0$$
$$(y_i - 1), \quad y_i \geq 1$$

The solution obtained by integrating the equation (60) from a certain initial value corresponds to a singular point of this equation (60). This implies ① , $x_i = 1, 0, y_j = 1, 0$ or $y_j = 1$ ② , $\begin{bmatrix} T & V \\ V^t & D \end{bmatrix} \begin{bmatrix} x \\ y \end{bmatrix} + \begin{bmatrix} b \\ 0 \end{bmatrix} =$ root of zero ③ , combination of ① and ②

Now, a check is made of the singular point of ② Based upon:

$$Tx+Vy+b=0 \quad (61)$$

$$V^t x+Dy=0 \quad (62)$$

$y=-D^{-1}V^t x$ - - - (63) is substituted for the equation (61), then it is obtained as follows:

$$(T - VD^{-1}V^t)x + b = 0 \quad (64)$$

where $$VD^{-1}V^t = -\begin{bmatrix} d_i v_{i1} \cdots d_k v_{ki} \\ \vdots \\ d_i v_{in} \cdots d_k v_{kn} \end{bmatrix} \begin{bmatrix} \frac{1}{d_i^2} & 0 \\ & \ddots \\ 0 & \frac{1}{d_k^2} \end{bmatrix} \begin{bmatrix} d_i v_{i1} \cdots d_i v_{in} \\ \vdots \\ d_k v_{ki} \cdots d_k v_{kn} \end{bmatrix} \quad (65)$$

$$= -\begin{bmatrix} \Sigma v_{i1}^2 & \Sigma v_{i1} v_{i2} \\ & \ddots \\ & & \Sigma v_{ik}^2 \end{bmatrix} = -W$$

As a consequence, the equation (63) becomes as follows:

$$T'x+b=0 \quad (66)$$

Characteristic 1

From the foregoing description, in the singular point (x, y) of the equation (59), it may be found that as long as "y" satisfies $\geq y_i \geq 0$ or $y_i \geq 1$, "x" is coincident with the singular point of the system having no inequality constraint.

A solution to be desirably obtained among the singular points is as follows:

$$x_i=1, 0 \; i=1,\ldots,n$$

$$1 \geq y_j \geq 0, \text{ or } y_j \geq 1, j=1,\ldots,k$$

To calculate a linearized equation around a balanced point, when $x=x'+c$, $c_i=1$ or 0, $$y=y', e \; 1 \geq e_j \geq 0 \text{ or } e_j \geq 1$$

are substituted for the equation (60), then the following equations are obtained:

$$\begin{pmatrix} \frac{dx'}{dt} \\ \frac{dy'}{dt} \end{pmatrix} = -\begin{pmatrix} 2(1-2c_1)x_i' & 0 & & \\ & \ddots & & \\ & & 2(1-2c_n)x_n' & \\ & & & f(e_i) \\ 0 & & & \ddots \\ & & & & f(e_k) \end{pmatrix} \begin{pmatrix} TC+Ve+b \\ t \\ Vx'+Dy' \end{pmatrix} \quad (67)$$

Accordingly, $$\frac{dx'}{dt} = -\begin{bmatrix} 2(1-2c_1)x_i' & 0 \\ & \ddots \\ 0 & 2(1-2c_n)x_n' \end{bmatrix} [TC+Ve+b] \quad (68)$$

$$\frac{dy'}{dt} = -\begin{bmatrix} f(e_i) & 0 \\ & \ddots \\ 0 & f(e_k) \end{bmatrix} [Dy'+V^t x'] \quad (69)$$

From the equation (68), $$\frac{dx'}{dt} = -\begin{bmatrix} 2(2c_1-1)(T_i c+V_i e+b_i) & 0 \\ & \ddots \\ 0 & 2(2c_n-1)(T_n c+V_n e+b_n) \end{bmatrix} x' \quad (70)$$

$$\frac{dy'}{dt} = -\begin{bmatrix} f(e_i)d_i^2 & 0 \\ & \ddots \\ 0 & f(e_k)d_k^2 \end{bmatrix} y' - \begin{bmatrix} f(e_i) & 0 \\ & \ddots \\ 0 & f(e_k) \end{bmatrix} V^t x' \quad (71)$$

where:

$$T_i=(T_{i1},\ldots,T_{in})$$

$$V_i=-(d_i v_{1i},\ldots d_k v_{ki})$$

From the foregoing formulae, the fixed value is expressed by:

$$\lambda_{c,i}=2(2c_i-1)(T_i c+V_i e+b_i) \; i=1,\ldots,n \quad (72)$$

Since the coefficient of y' in the equation (71) is equal to $$f(ei)di^2 \geq 0,$$

if $$\lambda_{c,i}<0 \; i=1,\ldots,n \quad (73)$$

is satisfied, then y' becomes also stable. That is to say, y becomes a dependent variable which does not given any influence to the convergence of x.

Characteristic 2.

When an apex $c=(c_1, \text{ - - -}, c_n)$ satisfies the inequality constraint formula (55), the fixed value of the equation (72) is equal to that of this inequality constraint formula (55). In other words, it is satisfied as follows:

$$\lambda_{c,i}=2(2c_i-1)(T_i' c+b_i), \; i=1,\ldots,n \quad (74)$$

This may be understood from the above-mentioned formula (72):

$$\lambda_{c,i} = 2(2c_i-1)\{(T_i'+W_i)c+V_i e+b_i\} \quad (75)$$
$$= 2(c_i-1)(T_i'+b_i)+2(2c_i-1)(W_i c+V_{ie})$$

A second term of the right-hand side of the above equation (75) as follows:

$$W_i c = \sum_{l=1}^{k} v_{li} v_{l1} c_1 + \ldots + \sum_{l=1}^{k} v_{li} v_{ln} c_n \quad (76)$$
$$= \sum_{j=1}^{n} \sum_{l=1}^{k} v_{li} v_{lj} c_j$$

$$V_{ie} = -(d_i v_{li} e_i + \ldots + d_k v_{ki} e_k) \quad (77)$$
$$= -\sum_{l=1}^{k} d_l v_{li} e_l$$

from the equation (55)

$$d_l e_l = \sum_{j=1}^{k} v_{lj} c_j + d_l \quad (78)$$

$d_l=0$: stasfies constraint. under constraint of $<0$: $1 \geq e_1 \geq 0$, it becomes $e_1=1$ which differs from the constraint under constraint of $>0$; $1 \geq e_1 \geq 0$, it becomes $e_1=0$ which differs from the constraint. under constraint of $e_1 \geq 1$, it becomes $e_1=1$ which differs from the constraint. When it is substituted for the equation (77), it is obtained as follows:

$$V_{ie} = -\sum_{l=1}^{k} \left( \sum_{j=1}^{n} v_{lj} c_j + dl \right) v_{li} = -W_i c - \sum_{l=1}^{k} d_l v_{li} \quad (79)$$

Consequently, when $d_l=0$, then it becomes:

$$W_{ic}+V_{ie}=0,$$

which can satisfy the equation (74).

Here, assuming now that a vertex or apex adjoining the vertex or apex "c" is equal to c(i), i=1, - - - , n, it may be understood that the following characteristic exists.

Characteristic 3.

When the vertex or apex "c" satisfies the inequality constraint as $T_{i1}, =0, i=1, \text{- - -}, n$, if with respect to E' of the equation (54), it satisfies:

$$E_c' < E'_{c(i)} \; i=1,\ldots,n \quad (80)$$

Then, the vertex or apex "c" corresponds to a minimum solution.

If all of the vertex or apex c(i) satisfy the inequality constraint, it is obvious from the theory 2 described on pages 470 to 471, the 38th convention 5F-2, Information Processing Institute. If the vertex or apex c(i) does not satisfy the constraint condition, it is obtained from the equations (75) and (79):

$$\lambda_{c,i} = \lambda_{c,i}' - 2(2c_i - 1) \sum_{l=1}^{k} d_l v_{li} \qquad (81)$$

where:
$$\lambda_{c,i}' = 2(2c_i - 1)(T_i'c + b_i)$$

$$d_l e_l = \sum_{j=1}^{k} v_{lj} c_j + d_l,$$

then when $c_j$ corresponds to $0 \to 1$, $v_{lj}$ has an symbol opposite to that of $d_l$.

Accordingly, it becomes:

$$-2(2 \cdot 1 - 1) \sum_{l=1}^{k} d_l v_{li} = -2 \sum_{l=1}^{k} d_l v_{li} > 0 \qquad (20)$$

Also, when $c_j$ is $1 \to 0$, the symbol of $v_{li}$ is equal to that of $d_l$. As a result, $$-2(0 \cdot 2 - 1) \sum_{l=1}^{k} d_l v_{li} = 2 \sum_{l=1}^{k} d_l v_{li} > 0$$

From these cases, since it becomes positive which will differ from the inequality constraint, the fixed value of $\lambda_{c,j}$ is increased. That is to say, as far as the vertex or apex c(i) satisfies the equation (80), even when it differs from the constraint condition, it never be stabilized. Accordingly, the characteristic 3 is satisfied.

As apparent from the foregoing description, the weight may be determined as follows. Assuming now that the energy is given by the below-mentioned equation, $$E = A \cdot f(x) + B \cdot g(x)^2 + C \cdot h(x,y)^2 \qquad (82)$$

where:
f(x): objective function
g(x): equality constraint condition
h(x,y): inequality constraint condition
A, B, C: weight As long as the inequality constraint condition is satisfied from the characteristic 2, since the inequality constraint does not give influence to the stability, the decision on the weights A and B is completely the same as when no inequality constraint exists. That is to say, assuming now that (1) the term $x_i 2$ of f(x), $g(x)^2$ is transferred into $x_i$ which is newly employed as f(x), $g(x)^{-2}$ (2) the solution for satisfying the constraint condition whose c-th and i-th elements are inverted, is employed as c(i), then it is obtained as follows:

$$A f(c) + B g(c)^2 = A f(c) < A f(c(i)) + B g(c(i))^2 \quad i=1, \ldots, n$$

namely, $$B \cdot g(c(i))^2 > A \cdot (f(c) - f(c(i))) \quad i=1, \ldots, n \qquad (83)$$

The weight B may be determined in such a manner that the formula (83) satisfies an arbitrary "c".

If a decision is made as described above, as long as the arbitrary "c" satisfies the inequality constraint form the characteristic 3, this "c" becomes stable. Next, it is decided that a stable solution not for satisfying the inequality constraint becomes unstable. The varied value of the fixed value caused by differing the inequality constraint corresponds to, from the formula (79), $$2C \sum_{l=1}^{k} |d_l v_{li}| \qquad (84)$$

Since the absolute value of the fixed value for satisfying the constraint condition is given by:

$$\max_i 2 |T_i'c + b_i| \qquad (85)$$

it may be selected as $$C\min \sum_{l=1}^{k} |d_l v_{li}| > \max_i |T_i'c + b_i| \qquad (86)$$

Since a minimum value of $d_1$ is equal to $d_i$, and to 1 when $V_{1i}$ is equal to an integer, it may be selected as:

$$C\min |v_{li}| > \max_i |T_i'c + b_i| \qquad (87)$$

When both $d_i$ and $v_{li}$ are not equal to an integer, unless "c" is set to a value greater than the formula (87), there are some possibilities that the solution not for satisfying the inequality constraint becomes stable.

It should be noted that when the term of $X_i 2$ within the inequality constraint is converted into $X_i$, since the solution for satisfying the equality constraint becomes stable, the term of $X_i 2$ within the inequality constraint remains as it is.

(iii) Improvement in Convergence

It is now assumed that energy of a combination problem in which there are equality constraint and/or inequality constraint is given as follows:

$$E = \frac{1}{2} x^t T x + b^t x \qquad (88)$$

where
x: n-th order vector
b: n-th, n-th' order vector
T: nxn-th order vector

At this time, assuming now that all of the elements of "b" are equal to positive or zero, and also $X_i = 0$ (i=1, - - - , n) namely an origin satisfies the inequality constraint, all of the fixed values of the origin are equal to negative or zero, and thus becomes stable. This solution has no meaning as to the combination problem for the origin. If the origin becomes stable, then there is a case that the origin is obtained as the solution, which is very inconvenient. At this time, assuming now that all of the elements of "b" are equal to positive or zero, and also $x_i = 0$ (i=1, - - - , n) namely as origin satisfies inequality constraint, all of the fixed values of the origin are equal to negative or zero, and thus becomes stable. This solution has no meaning as to the combination problem for the origin. If the origin becomes stable, then there is a case that the origin is obtained as the solution, which is very inconvenient. To this end, the following inequality constraint condition is added to the energy of the equation (88):

$$\sum_{i=1}^{n} x_i \geq 1 \qquad (89)$$

Although the right-hand side is selected to be 1, it is possible to change this value, depending upon the problem. As a result, the energy E' is selected to be:

$$E' = E + \frac{1}{2} F \cdot \left( y - \sum_{i=1}^{n} x_i \right)^2 \quad (90)$$

At this time, since the increased value of the fixed value caused by differing the inequality constraint of the formula (89), at the origin becomes 2F, if it is set to:

$$F > \min_{i} b_i \quad (91)$$

at least one of the fixed values becomes positive and thus the origin becomes unstable, which may stabilize the convergence.

Now assuming that an origin does not satisfy inequality constraint due to its original problem, it may set the origin to the unstable condition by changing the weight related to the inequality constraint.

With the above-described features 1 and 2, the present invention may achieve the following effects and advantages 3 and 4.

3. (i) Representation of Energy Function

By setting the diagonal element of the coefficient matrix T or S to zero, all of the extreme points having the minimal values become stable points and it is possible that the solution converges into the minimal value.

(ii) Decision on Weight

The weights between the constraint conditions are set in such a manner that the same energy is increased when each of the constraint conditions differ from the constraint. The weights between the constraint condition and evaluation function may be set in such a manner that an increase in the energy of the constraint condition when differing from the constraint condition is greater than a decrease in the energy of the evaluation function, and thus the solution for satisfying the constraint condition is equal to the minimum value.

(iii) Selection on Initial Value of Integral

Selecting an initial value to a center point of a region whose variable changes enables a minimum value or a minimal value close to this minimum value to be obtained.

It is possible to prevent that a solution converges inside a region by setting as an initial value a value of a center value by adding values thereto whose absolute values are different from each other.

(iv) Improvement in Convergence

It may be possible to obtain such a solution having a lower energy value by employing such a manner that with respect to the once obtained solution, the value of the diagonal element is increased so as to make this solution unstable and thereafter another solution may be again obtained.

(v) Integral Method

A check is made whether or not a value of energy after a time unit Δt is decreased as compared with a previous value of energy. As a result, it may maintain stable convergence by adjusting a magnitude of Δt.

It may also be possible not to obtain such a solution whose energy is not equal to a minimum value by determining an initial value of Δt, depending upon a maximum value of an absolute value of (½T1+b) or "b".

(vi) Solution Converged into Boundary

When a solution converges into a boundary and a diagonal element of T(S) becomes positive, a selection can be made of a solution having a lower energy value by setting an extreme point nearest the boundary as a solution.

4. (i) Model of Neurocomputer In Case of Inequality Constraint

It is possible to handle inequality constraint as equality constraint by equalizing inequality constraint given in the equations (50) and (51) like the equations (52) and (53). When the inequality constraint is satisfied, "y" takes a value between "0" and "1", or a value more than 1 by converting the internal condition of the neuron into the output yi based upon the equation (58). When the inequality is not satisfied, it may be possible to take y as a value of 0 or 1.

(ii) Decision on Weight in Energy

When energy is given as the formula (82), there can be obtained a solution of a combination 1 and 0 by transforming the squared terms contained in the objective function and equality constraint condition into a first power term. Also, when there is no equality constraint condition, it is possible to obtain a solution of a combination 1 and 0 by converting the squared terms of the objected function and inequality constraint condition into a first power term.

With respect to a solution for satisfying an arbitrary equality constraint condition, an output of one of certain neurons is inverted so that weights of an objective function and an equality constraint condition are determined in order to increase energy, and all of solutions for satisfying the equality constraint condition become stable. Thus, it is possible to obtain a solution by setting an initial value near the solution.

In addition thereto, when the weight for the inequality constraint is determined in such a manner that the solution not for satisfying the inequality constraint condition becomes unstable, a solution for satisfying the equality constraint and inequality constraint can be made stable.

(iii) Improvement in Convergence

In case that a fixed value at an origin becomes negative, and thus the origin becomes stable, the origin is made unstable by introducing an inequality constraint formula and a solution for satisfying a constraint condition can be obtained.

BRIEF DESCRIPTION OF THE DRAWINGS

FIG. 14 is a schematic diagram for explaining an influence by an initial value given to a convergence value;

FIGS. 15 to 17 are schematic diagrams for representing an effect of an improvement in the convergence;

FIG. 18 is a schematic diagram for explaining an influence by an integral unit given to a convergence value;

PREFERRED EMBODIMENT(S) FOR CARRYING OUT THE INVENTION

Figure 4:
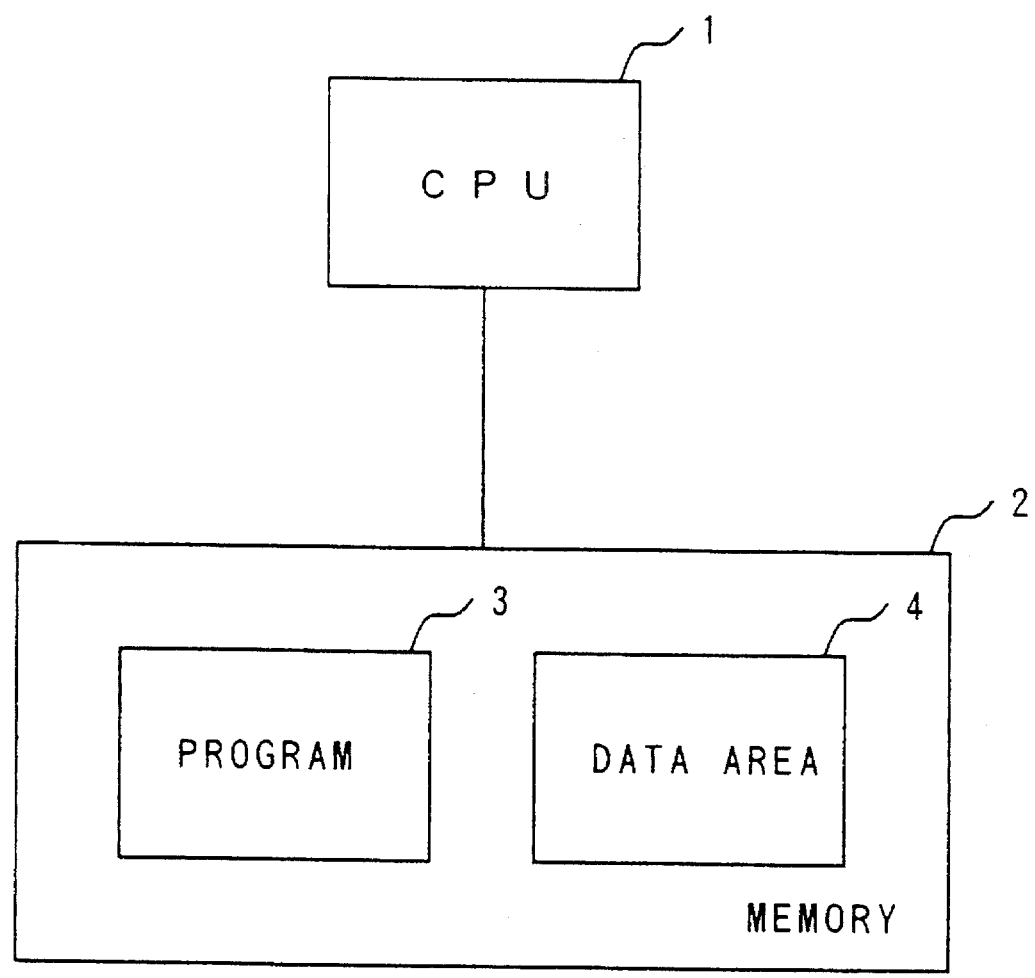
FIG. 4 is an entire construction diagram according to the embodiment of the present invention.

Referring now to FIG. 4, an embodiment of the present invention will be described. In this figure, reference numeral 1 indicates a CPU (central processing unit); reference numeral 2 denotes a memory; reference numeral 3 represents a program to solve an optimum combination matter, or problem; and reference numeral 4 is a data area used by the program 3. To solve the combination matter, when the program 3 is initiated, the program 3 executes computation in accordance with input data by utilizing the data area 4 to output a computation result.

Figure 1:
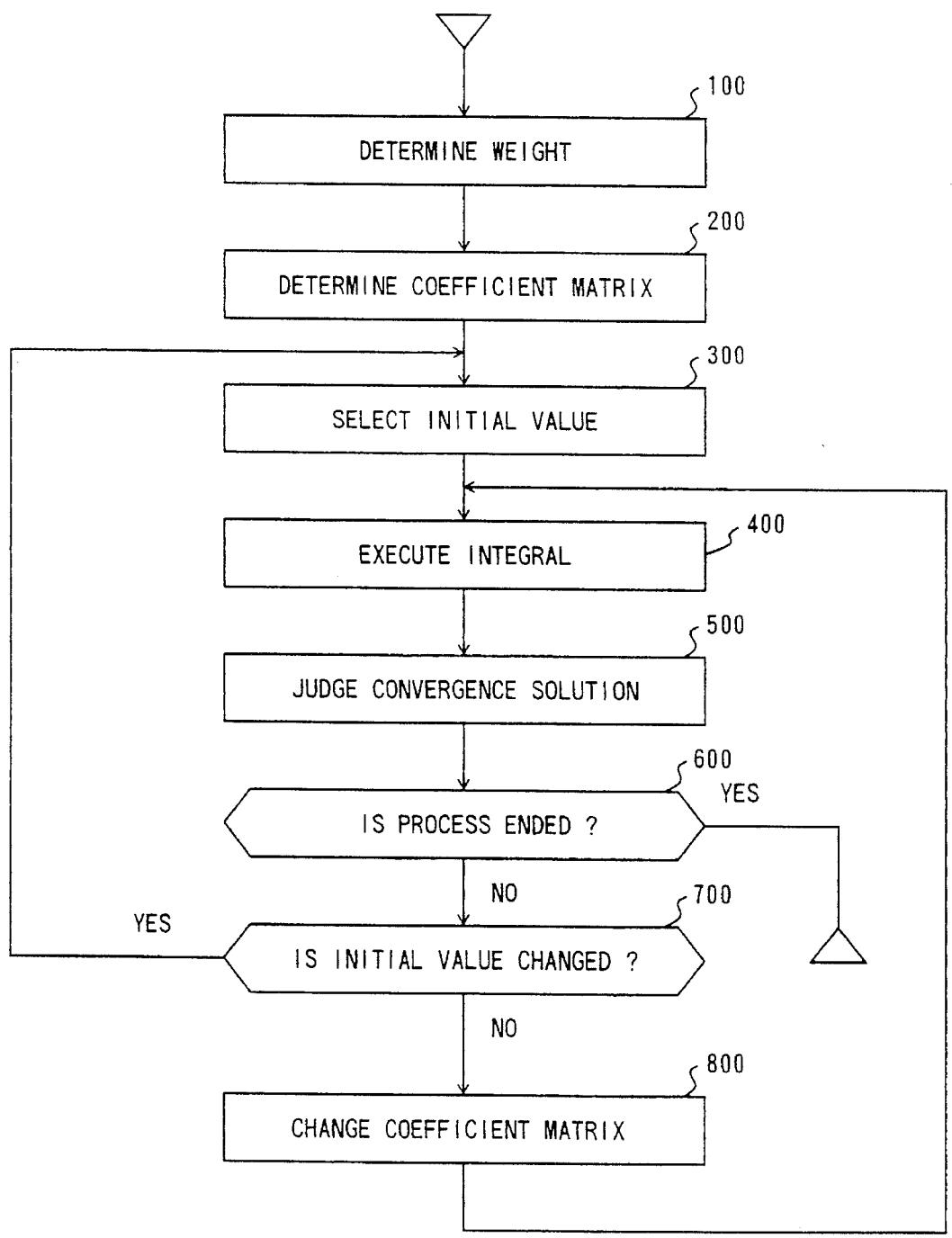
FIG. 1 illustrates an embodiment according to the present invention.
Figure 2:
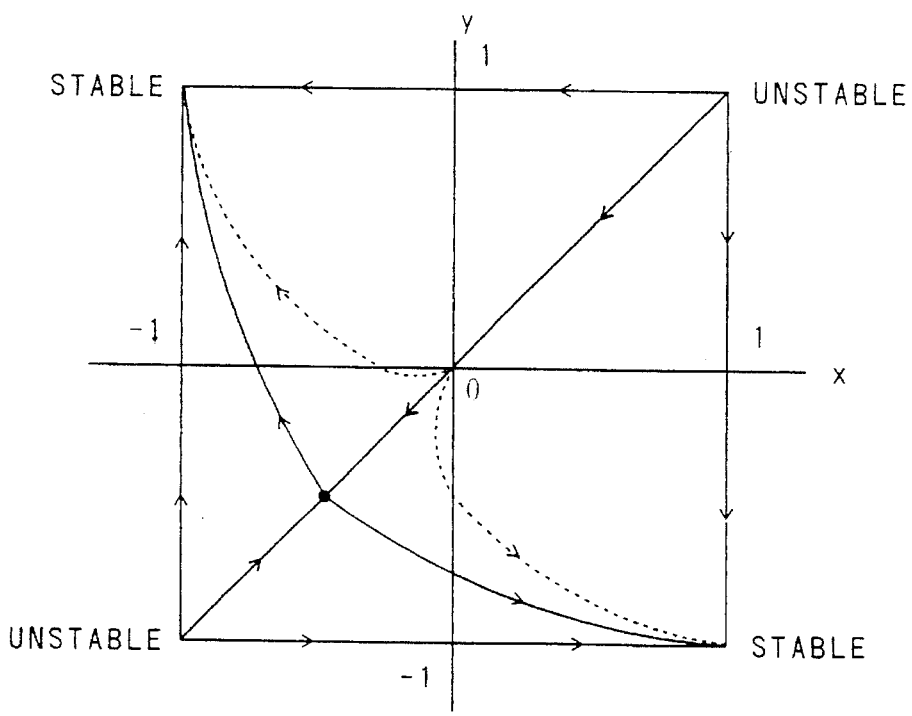
FIGS. 2 and 3 are schematic diagrams for explaining an influence by an initial value given to convergence value.
Figure 3:
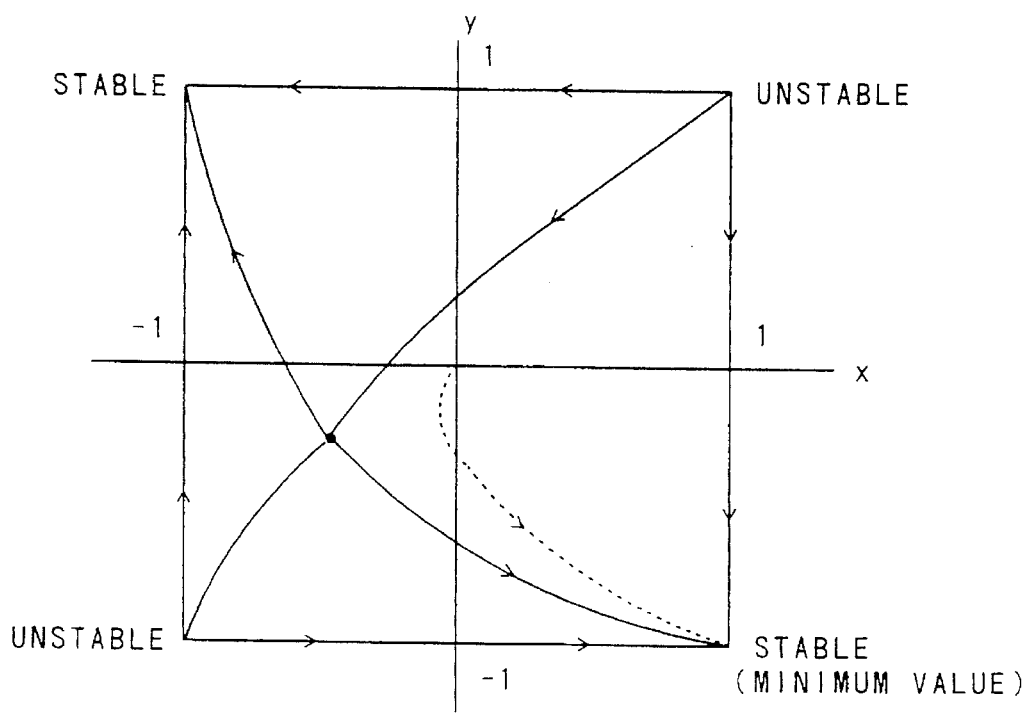

In FIG. 1, there is shown an operation sequence of the program 3. In this figure, reference numeral 100 denotes a step for determining a weight, reference numeral 200 represents a step for determining a coefficient matrix; reference numeral 300 is a step for selecting an initial value of integral; reference numeral 400 indicates a step for executing the integral; reference numeral 500 denotes a step for judging a convergence solution; reference numeral 600 a step at which when the process is permitted to be ended in accordance with the judgement result of the step 500, the process is completed, otherwise the process is advanced to a further step 700; reference numeral 700 is such a step that when the initial value is changed in accordance with the judgement result of the step 500, the process is advanced to the step 300, otherwise the process is advanced to a further step 800; and reference numeral 800 indicates a step for varying the coefficient matrix.

Figure 5:
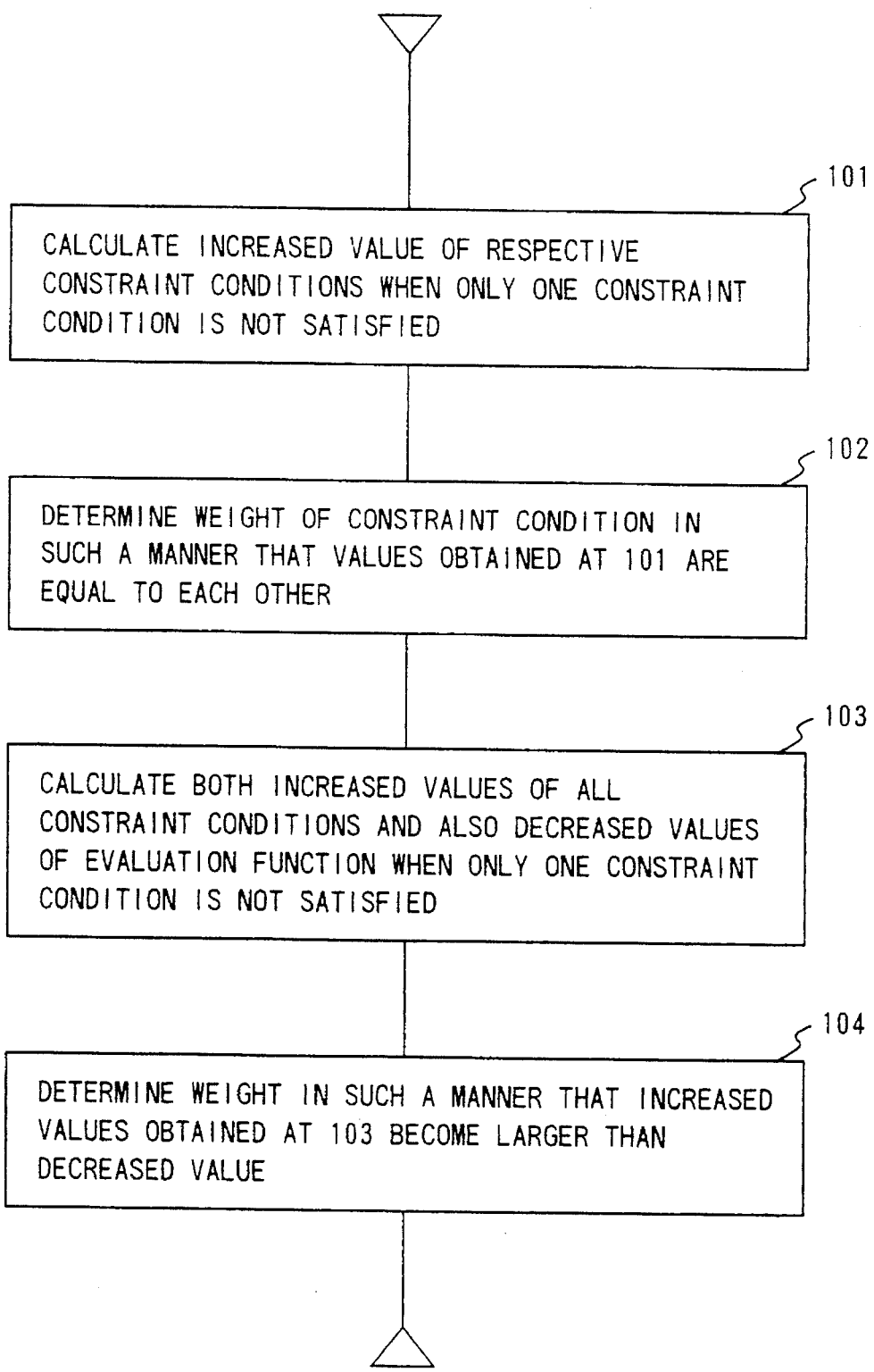
FIGS. 5 through 11 are detailed diagrams for explaining the sequence defined in FIG. 1.

Each step will now be described in detail. The step 100 for determining the weight is represented in FIG. 5. It is assumed that energy is represented as follows:

$$E = \omega_0 f + \omega_1 g_1 + \ldots + \omega_n g_n \quad (92)$$

where "f" indicates an evaluation function, "$g_1$" to "$g_n$" are constraint conditions, and "$\omega_0$" to "$\omega_n$" are weights.

At this time, the following processes are executed in FIG. 5.

101 - - - A calculation is made of increased values for the constraint conditions "$g_1$" to "$g_n$" under condition that only one constraint condition is not satisfied.

102 - - - Assuming now that the increased values with respect to the constraint conditions $g_1$ to $g_n$ obtained at the step 101 are $\Delta g_1$ to $\Delta g_n$, a ratio of $\omega_1$ to $\omega_n$ is determined in such a manner that values of $\omega_1 \Delta g_1$ to $\omega_n \Delta g_n$ are equal to each other. As a result, it is assumed that the constraint term has been determined as:

$$\omega_i(g_1 + \alpha_2 g_2 + \ldots + \alpha_n g_n) \quad (93)$$

where $\alpha_2$ to $\alpha_n$ are constant, and $\omega_i$ is determined by the below-mentioned process.

103 - - - Another calculation is made of an increased value of such a constraint condition that only one constraint condition is not satisfied in accordance with the formula (93), and then a calculation result is referred to "$\omega_i \alpha g$". Also, a decreased value in an evaluation function is calculated at this time (this decreased value corresponds to "$\omega_0 \Delta f$").

104 - - - A decision is made of values of $\omega_i$ and $\omega_0$ under condition that $\omega_i \Delta g > \omega_0 \Delta f$.

Then, the step 200 for determining the coefficient matrix will now be described with reference to FIG. 6.

201 - - - Based upon an energy function E, both an n×n order coefficient matrix "T" and an n×n order input vector "b" are determined, which become:

$$E = \frac{1}{2} x^t T x + b^t x$$

202 - - - If the input data corresponds to 0, 1 problem, then the process is advanced to a further step 203. If not, then the process is advanced to another step 204.

203 - - - An element "bi" of the input vector is corrected as $b_i \leftarrow b_i + T_{ii}/2$.

In connection thereto, Ti1 is set to zero.

204 - - - A diagonal element Ti1 of the coefficient matrix T is assumed to be zero.

Further, the step 300 for selecting the initial value will now be described with reference to FIG. 7.

300 - - - When the process is continued from the step 700, then it is advanced to a step 303. If not, then the process is advanced to a step 302.

302 - - - An initial value is set at a central point of a region where a variable "X" is changed. In the 0, 1 problem, the initial value is set to a point (½, - - -, ½), whereas it is set to an origin in the −1, 1 problem.

303 - - - A very small value is added to a certain element (either a single element, or plural elements are available) in which the original initial value is present. It should be noted that when the very small values are added to the plural elements, absolute values thereof are different from each other. The smaller the magnitudes of these very small values become, the better they are.

Figure 8:
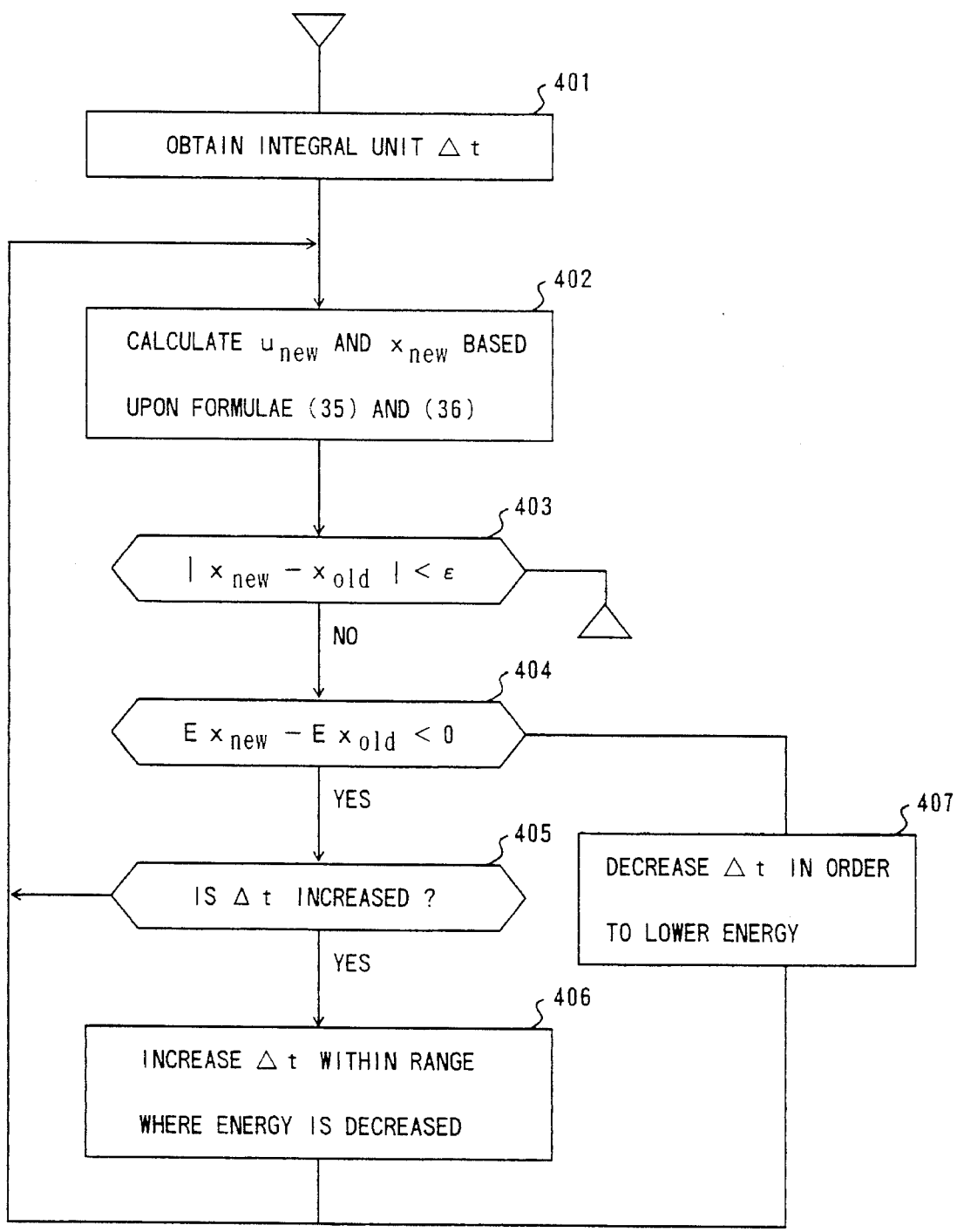

The step 400 for executing the integral will now be described with reference to FIG. 8.

401 - - - A determination is made of an integral unit $\Delta t$. The integral unit $\Delta t$ is determined in such a way that as to the 1, 0 problem, in formula (39) this value is equal to:

$$\max_i \left| \left( \frac{1}{2} TI + b \right)_i \right| \Delta t < u_{max}$$

and then with respect to 1, −1 problem, this value is equal to, in formula (40).

$$\max_i |b_i| \Delta t < U_{max}$$

It should be noted that $U_{max}$ may be selected in a range from 5 to 10.

402 - - - Based upon formulae (35) and (36), values of $U_{new}$ and $X_{new}$ are calculated.

403 - - - If all of absolute difference values for the respective elements corresponding to $X_{new}$ and $X_{old}$ are smaller than the very small value "ε" then the process is accomplished. If not, then the process is advanced to a step 404.

404 - - - If a difference between the energy values $EX_{new}$ and $EX_{old}$ based upon the values $X_{new}$ and $X_{old}$ is equal to a negative, then the process is advanced to a step 405. If not, then the process is advanced to another step 407.

405 - - - When $\Delta t$ is increased, the process is advanced to a step 406. Otherwise, the process is advanced to a step 402. It should be understood that a decision whether or not $\Delta t$ is increased, is determined by checking whether or not $\Delta t$ has been decreased before and the like.

406 - - - $\Delta t$ is increased within a range where $EX_{new} - EX_{old} < 0$ is satisfied. At this time, it is confirmed that the above-described condition is satisfied by increasing $\Delta t$ of formula 35 thereby to calculate $U_{new}$ and $X_{new}$.

407 - - - The condition of $EX_{new} - EX_{old} < 0$ is satisfied by decreasing $\Delta t$.

Figure 9:
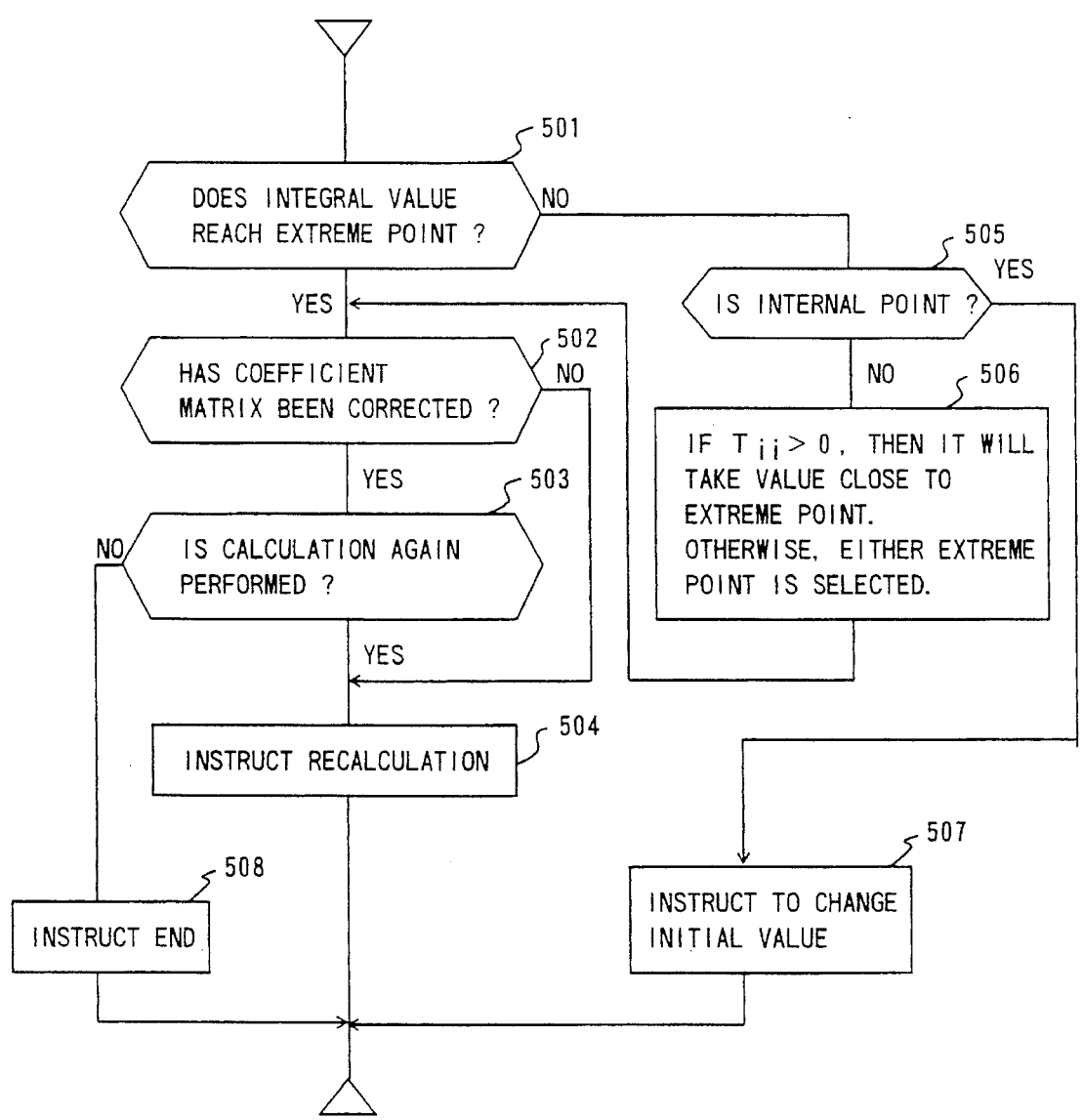

Subsequently, the step 500 for judging the convergence will now be described with reference to FIG. 9.

501 - - - If the integral value reaches an extreme point, then the process is advanced to a step 502. If not, then the process is advanced to a step 505.

502 - - - When the process defined at the step 800 has been executed, then the process is advanced to a step 503. If not yet executed, then the process is advanced to another step 504.

503 - - - When no recalculation is required, a solution having the lowest energy among the solutions which have been obtained is used as a calculated solution and thus the process is advanced to a step 508. If not, then the process is advanced to a step 504. It should be noted that a decision whether or not the recalculation is performed is determined by checking whether or not the below-mentioned change process of the coefficient matrix is again performed.

504 - - - An instruction is made to recalculate an integral and then the process is completed.

505 - - - In case that the integral value is converged to an interval point, the process is advanced to a step 507. Otherwise, the process is advanced to a step 506.

506 - - - When the integral value is converged into a surface not corresponding to the extreme point of the region, if $T_{i1} > 0$ with extreme point, it will take a value of an extreme point close to Xi. If $T_{i1} = 0$, then it will take the value of either extreme points.

507 - - - An instruction to change the initial value is made and the process is completed.

508 - - - An instruction to complete the integration and thereafter the process is ended.

Figure 10:
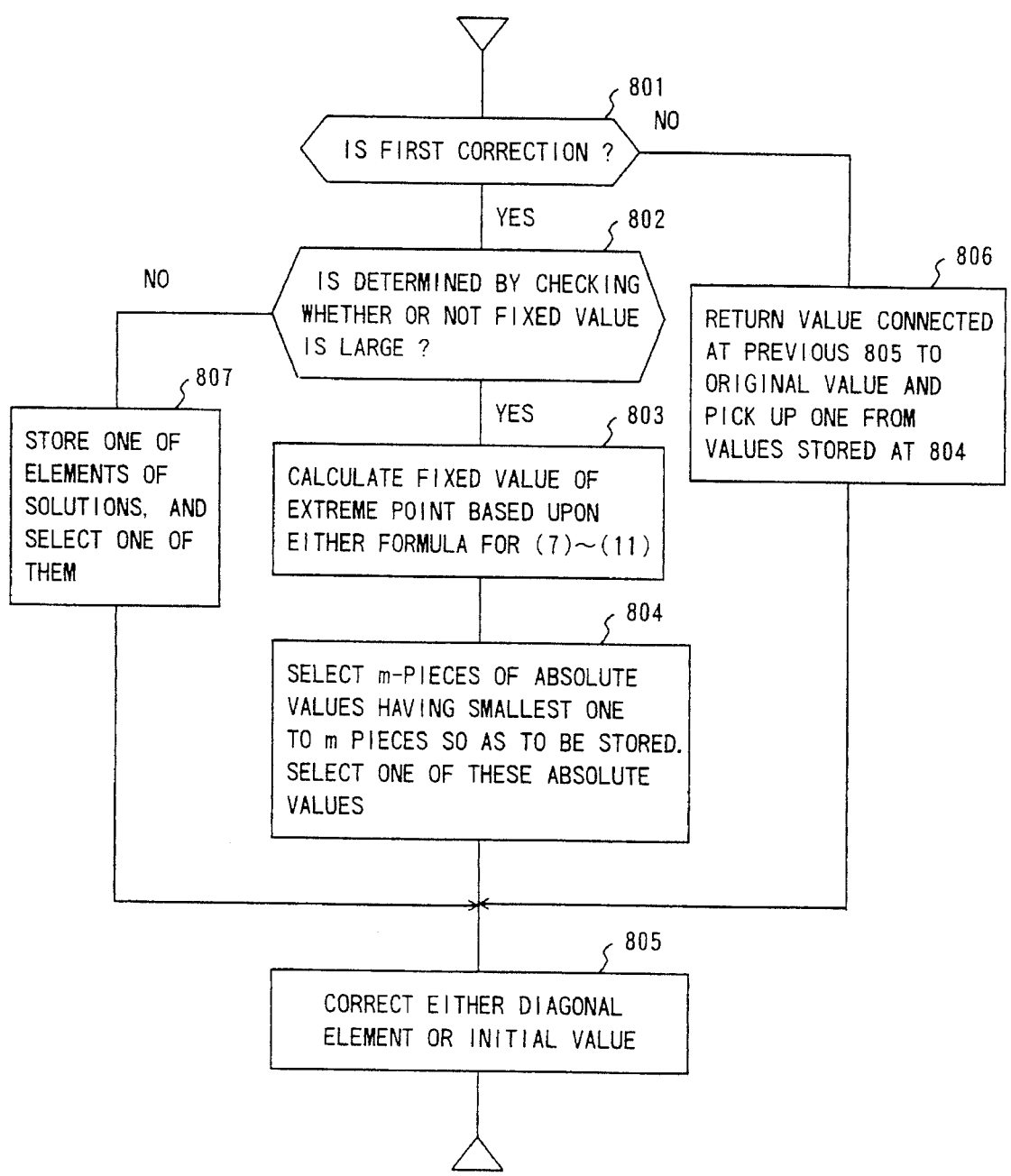

Referring now to FIG. 10, a description will be made of the step 800 for changing the coefficient matrix.

801 - - - When the correction is first, the process is advanced to a step 802. Otherwise, the process is advanced to a step 806.

802 - - - When the correction is carried out by checking whether or not the fixed value is large, the process is advanced to a step 803. Otherwise, the process is advanced to a step 807.

803 - - - The fixed value of the solution is calculated based upon either formula (7) or (11), and then the process is advanced to a step 804.

804 - - - A selection is made of m-pieces of absolute values of the fixed values from the smallest value up to m-th value, and the selected fixed values are stored. One of these fixed values is selected and the process is advanced to a step 805. It should be noted that "m" may be selected from 1 to "n" at maximum.

Figure 11:
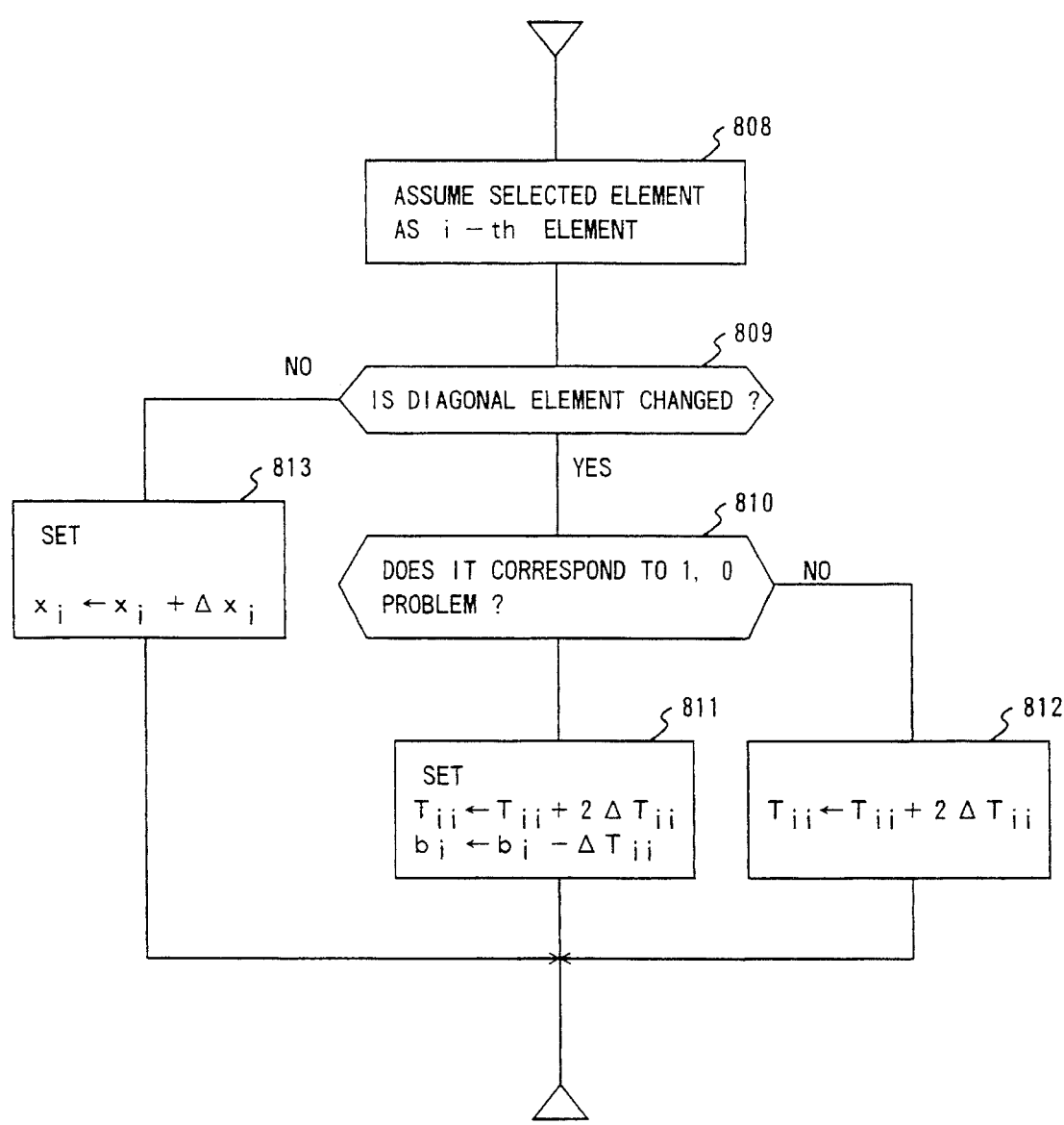

805 - - - Either diagonal element or initial value is corrected in accordance with a sequence as represented in FIG. 11.

806 - - - Either the diagonal element or initial value which has been corrected in the previous step 805 is returned to an original value thereof. One of the fixed values stored at the step 804 is picked up and then the process is advanced to the step 805.

807 - - - The elements of the solution X being equal to Xi=1 are stored and one element is selected, and then the process is advanced to a step 805. Next, the sequence of the step 805 will now be explained with reference to FIG. 11.

808 - - - It is assumed that the elements selected at the steps 804, 806, 807 are i-th elements.

809 - - - When the diagonal element is varied, the process is advanced to a step 810. When the initial value is changed which is equivalent to the change of the diagonal element, the process is advanced to a step 813.

810 - - - In case of the 1, 0 problem, the process is advanced to a step 811. In case of 1, −1 problem, the process is advanced to a step 812.

811 - - - Both the i-th diagonal element and input vector are changed as follows; respectively $$T_{i1} \leftarrow T_{i1} + 2\Delta T_{i1}$$

$$b_i \leftarrow b_i - \Delta T_{i1}$$

812 - - - The i-th diagonal element is changed as follows:

$$T_{i1} \leftarrow T_{i1} + 2\Delta T_{i1}$$

813 - - - The initial value of the i-th element for the variable vector is varied as follows.

$$X_i \leftarrow X_i + \Delta X_i$$

Note that $\Delta X_i$ is selected in case of the 1, 0 problem:

$$0 < X_i + \Delta X_i < 1$$

Then, in case of the 1, −1 problem, $\Delta X_i$ is selected as follows:

$$-1 < X_i + \Delta X_i < 1$$

$\Delta T_{i1}$ defined at the steps 811 and 812 may be set within the following range:

$$0 < \Delta T_{i1} < \gamma |\lambda_{c,i}| + \epsilon$$

It should be noted that "γ" is selected to be 1 in case of the 1, 0 problem, whereas "γ" is selected to be 2 in case of the 1, −1 problem, and also "ε" is a very small amount. If $\Delta T_{i1}$ is selected to be values more than the above-described values, the first calculated solution may become unstable.

Also, it should be noted that although there has been represented the method for setting $\Delta T_{i1}$ and $\Delta X_i$ only one time in accordance with the above-explained sequence, an investigation may be performed for any combinations between $\Delta T_{i1}$ and $\Delta X_j$. Further, although either the diagonal element or initial value which has been once changed is returned to the original value thereof and then the subsequent correction is carried out, it may be possible to remain as it is, and to improve the solutions.

Figure 12:
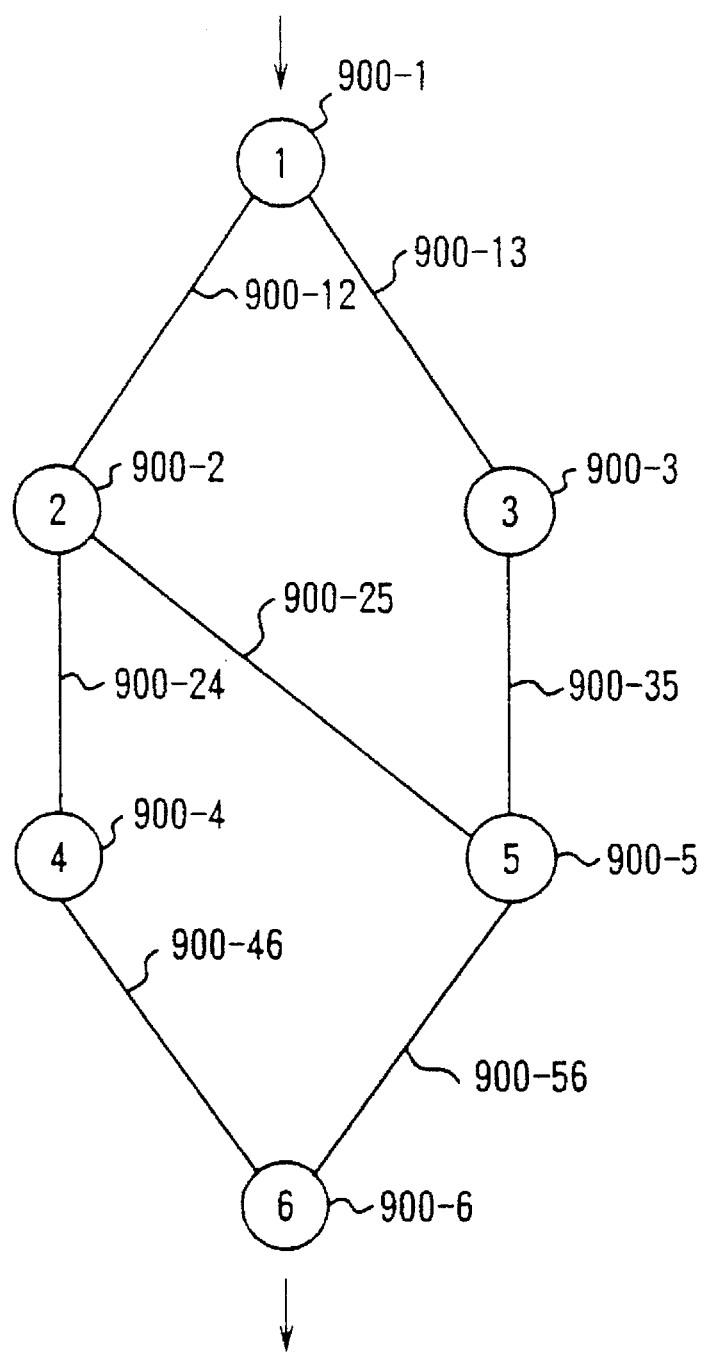
FIG. 12 is a schematic diagram for explaining a transportation matter.
Figure 13:
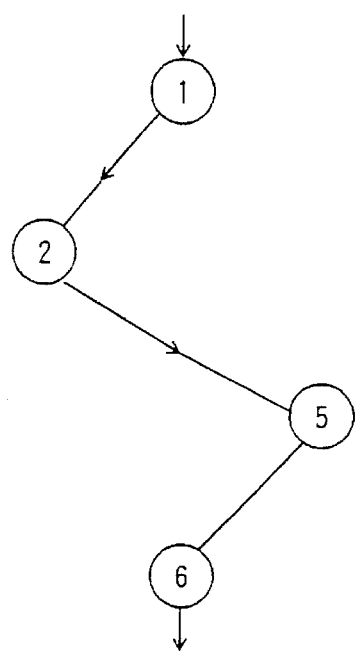
FIGS. 13A to 13D are pattern diagrams of solutions for the transportation matter.
Figure 13:
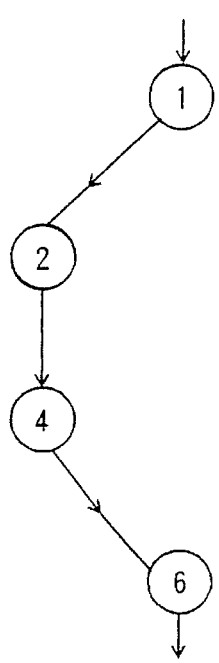
Figure 13:
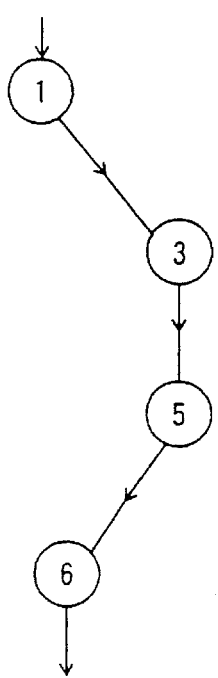
Figure 13:
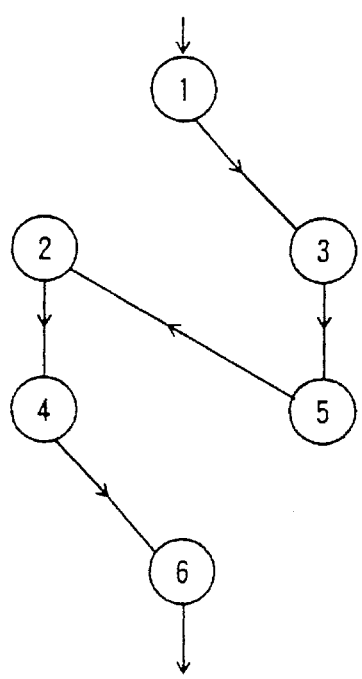

A description will now be made of a concrete example. In the various technical fields, it is required to solve the optimum combination matters or problems. One of these problems to be solved is a transportation problem. As to the transportation problem, it is constructed of transportation paths for connecting a relay point with another relay point, transportation costs have been determined for the respective transportation paths through which vehicles have passed, and there is such a problem to determine the transportation path having the minimum transportation cost when the vehicle is traveled from a certain relay point to another relay point. FIG. 12 represents this example. In this figure, reference numerals 900-1 to 900-6 denote relay points, reference numerals 900-12 to 900-56 indicate transportation paths. The transportation costs have been determined with respect to these transportation paths. For instance, a search is made of the transportation path with the lowest cost when a vehicle is traveled from the relay point 900-1 to the relay point 900-6.

Assuming now a communication network, there is a problem how to select a communication line with a minimum communication cost when data is transferred from a relay point to another relay point. Assuming now to a cargo transport system, there is another problem how to select a route with a minimum transport cost when a cargo is transported from a certain relay point to another relay point.

Energy "E" with respect to such a transportation problem is given as follows:

$$E = A/2 \sum_{i=1}^{n} \left( I_i + \sum_{j \in N(i)} (b_{ji} - b_{ij}) \right)^2 + \qquad (40)$$

$$B/2 \sum_{i=1}^{n} \sum_{j \in N(i)} b_{ij} b_{ji} + D/2 \sum_{i=1}^{n} \sum_{j \in N(i)} (b_{ij} + b_{ji}) c_{ij}$$

It should be noted that as to the first term at each relay point, under such a constraint condition that the incoming/outgoing transportation amount is equal to zero, Ii: corresponds to the transportation amount of the i-th relay point into which a cargo is injected from an external point and from which a cargo is derived to the external point. If this relay point corresponds to a starting point, $I_i=1$. If this relay point corresponds to an ending point, $I_i=-1$. If this point corresponds to any point other than the starting and ending points, $I_i=0$.

$b_{ij}$: corresponds to a variable "1" when the cargo is transported from the i-th relay point to the i-th relay point, and to another variable "0" when no cargo is transported therebetween.

$N(i)$: corresponds to a set of the relay points connected to the relay point "i".

n: corresponds to a total number of the relay points.

A: corresponds to a weight.

Also, in the second term, the relay points "i" and "j" correspond to constraint whether or not the cargo is transported from "i" to "j" or "j" to "i", and B corresponds to a weight.

The third term represents a total cost for the transportation.

$C_{ij}$: corresponds to a cost for the transportation effected between the relay points "i" and "j".

D: corresponds to a weight.

A solution of the above-described transportation problem or matter may be obtained in accordance with the sequence shown in FIG. 1.

First, the weight may be determined in accordance with the sequence of FIG. 5 as follows. "A" and "B" are weights with regard to the constraint conditions. Since the increased values of the first and second terms are "A" and "B" when only one constraint condition is not satisfied, thus $$A = B \qquad (95)$$

Also, since the increased value of the constraint condition corresponds to 2A when only one constraint condition is not satisfied, and the maximum value of the decreased value in the third term corresponds to $D_{max} c^{ij}$, both A and B may be $$i, j$$

determined in such a way:

$$2A > D_{max} c_{ij} \qquad (96)$$
$$i, j$$

Figure 6:
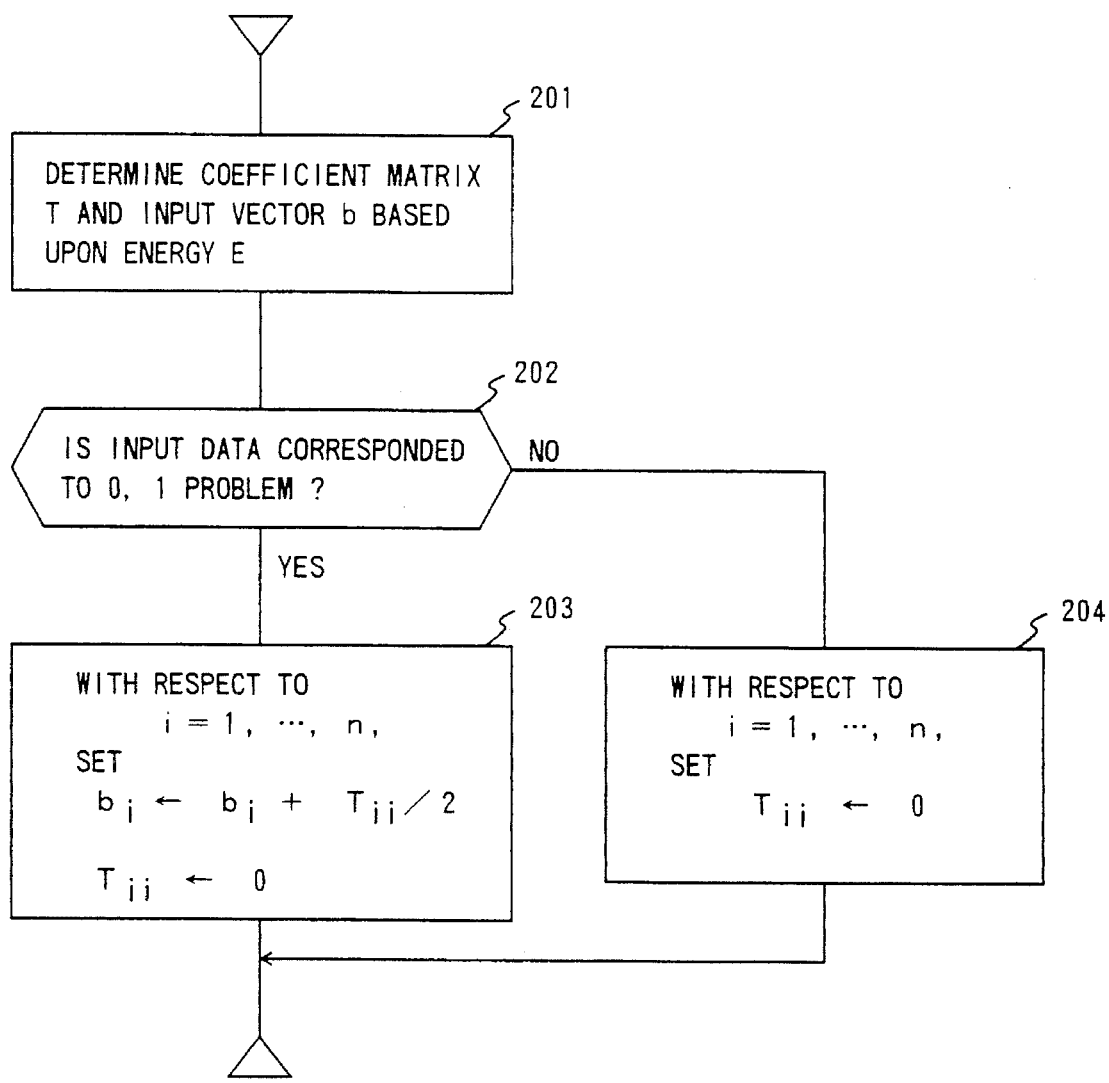

A decision on the coefficient matrix may be performed in accordance with FIG. 6. If the constant term of "E" is omitted, under:

$$E = \frac{1}{2} (\ldots, b_{ji}, b_{ji} \ldots) T \begin{pmatrix} \vdots \\ b_{ij} \\ b_{ji} \\ \vdots \end{pmatrix} + b^t \begin{pmatrix} \vdots \\ b_{ij} \\ b_{ji} \\ \vdots \end{pmatrix},$$

$$T = \begin{matrix} b_{ij} \\ b_{ji} \end{matrix} \begin{pmatrix} b_{ij} & b_{ij} & b_{ik} & b_{ik} \\ \vdots & \vdots & \vdots & \vdots \\ 2A & \cdots & A & \cdots & A & \cdots & A \cdots \\ \vdots & \vdots & \vdots & \vdots \\ -A & \cdots & A & \cdots & -A & \cdots & A \cdots \\ \vdots & \vdots & \vdots & \vdots \end{pmatrix}$$

$$b = - \begin{pmatrix} \vdots \\ AI_i + AI_j + Dc_{ij}/2 \\ AI_i + AI_j + Dc_{ij}/2 \\ \vdots \end{pmatrix} \begin{matrix} b_{ij} \\ b_{ji} \end{matrix}$$

Because of the 0, 1 problem, when the diagonal element of "T" is increased and the element of the corresponding "b" is corrected, both "T" and "b" are obtained as follows:

$$T = \begin{matrix} b_{ij} \\ b_{ij} \end{matrix} \begin{pmatrix} b_{ij} & b_{ji} & b_{ik} & b_{ik} \\ \vdots & \vdots & \vdots & \vdots \\ O & \cdots & A & \cdots & A & \cdots & -A \cdots \\ \vdots & \vdots & \vdots & \vdots \\ -A & \cdots & O & \cdots & -A & \cdots & A \cdots \\ \vdots & \vdots & \vdots & \vdots \end{pmatrix}$$

$$b = - \begin{pmatrix} \vdots \\ AI_i + AI_j + A + Dc_{ij}/2 \\ AI_i + AI_j + A + Dc_{ij}/2 \\ \vdots \end{pmatrix} \begin{matrix} b_{ij} \\ b_{ji} \end{matrix}$$

Figure 7:
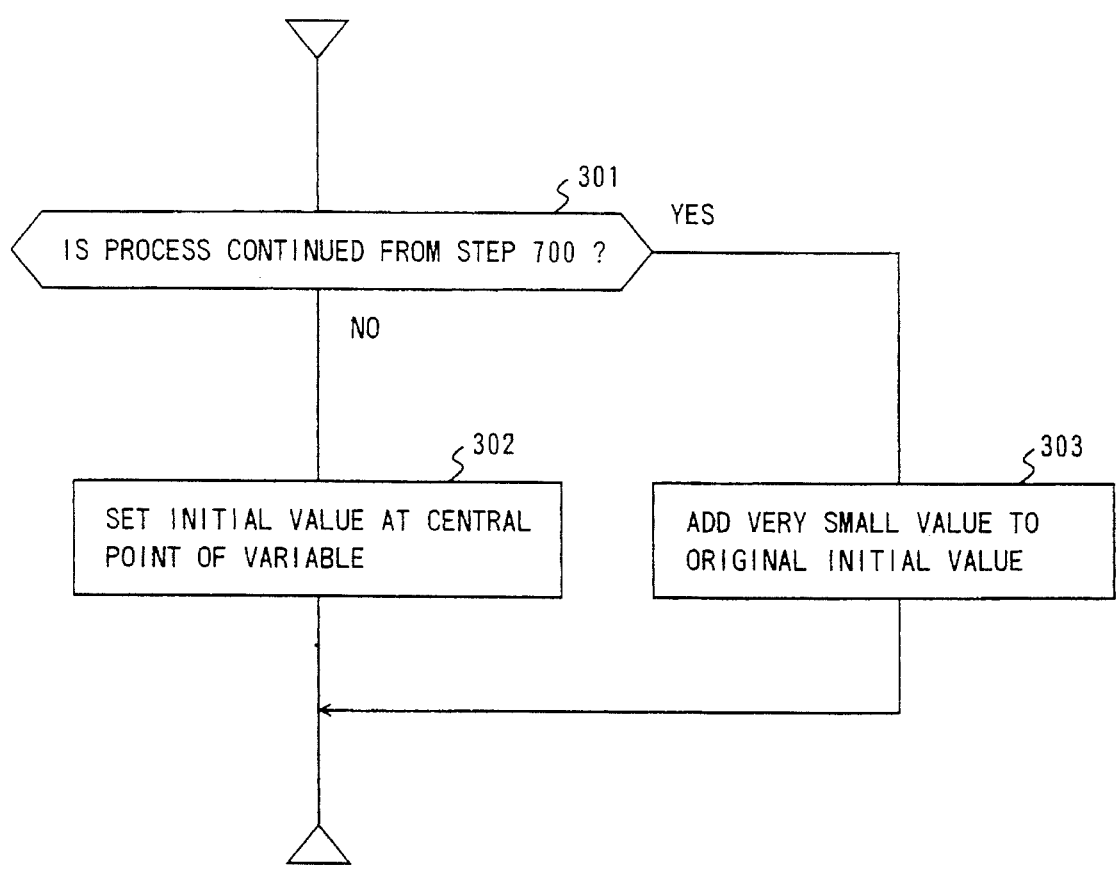

The initial value is set to ½I from FIG. 7. The integral calculation is performed in accordance with FIG. 8. In this case, the integral unit $\Delta t$ is determined in such a manner that it becomes:

$$\frac{1}{2}TI+b = \begin{pmatrix} \vdots \\ -AI_i+AI_j+\frac{A}{2}Dc_{ij} & b_{ij} \\ AI_i+AI_j+\frac{A}{2}Dc_{ij} & b_{ji} \\ \vdots \end{pmatrix} \quad (97)$$

$$\max_{i,j}|-AI_i+AI_j+\frac{A}{2}+Dc_{ij}|\Delta t < u_{max}$$

$$\max_{i,j}|AI_i+AI_j+\frac{A}{2}+Dc_{ij}|\Delta t < u_{max}$$

It should be noted in FIG. 12 that the following condition is established:

$I_1=1, I_6=-1, I_2-I_5=0$ $C_{12}=C_{21}=1.1$ $C_{13}=C_{31}=2.2$ $C_{24}=C_{42}=1.3$ $C_{25}=C_{52}=2.1$ $C_{35}=C_{53}=2.5$ $C_{46}=C_{64}=2.0$ $C_{56}=C_{65}=0.5$

Although the weight may be selected to satisfy the formula (48) at this time, for instance, it may be set:

$D=1, A=12$.

Also, since the maximum value in the left-hand side is equal to 18.5 $\Delta t$ based upon formula (44), $U_{max}=10$ and $\Delta t=0.5$.

At this time, all of the fixed values become negative. That is to say, the stable extreme points correspond to four different points as represented in FIGS. 13A to 13D and also to such extreme points all of which become zero. If the initial value is set to ½I, since no reduction occurs in this problem, the solution with the minimum cost of FIG. 13A can be obtained. As a consequence, at the step 700 of FIG. 1, it is not necessary to vary the initial value. Even if the coefficient matrix of the step 800 is changed, there is no improvement in the solution.

Advantages of the embodiment according to the present invention, previously explained, will now be described.

(A) Representation on Energy Function

As the particular advantage when either the coefficient matrix "T" or the diagonal element of "S" is set to zero, in case that, for instant, n=2, A=B=2.5, D=1 and dxy=1 with respect to the traveling salesman problem indicated by the energy function of formula (19), if the diagonal element is equal to zero, the stable extreme points become (1100), (1010), (0101), (0011), (1001) and (0110). Last, two extreme points among these extreme points correspond to the solution for satisfying the constraint. To the contrary, if the diagonal element is not set to zero, all of the above-described stable extreme points become unstable extreme points and no solution can be obtained. Accordingly, it can be found that setting the diagonal element of the coefficient matrix to zero is very useful for obtaining the stable solution.

(B) Decision on Weight

In the example of (A), since $d_{xy}=1$, if A=B, then it is required to set A>2D based upon formula (23). To the contrary, if A=1.5 and D=1, then the stable points of the extreme points are:

(1000), (0100), (1100), (0010), (1010), (0001), (0101), (0011)

Then the extreme points for satisfying the constraint condition do not correspond to the stable points. As a consequence, it may be understood that the decision on the weight, as described in the present invention, becomes very important.

(C) Selection of Initial Value of Integral Calculation

With respect to the traveling salesman problem of n=2 in (A), a convergence status is shown in FIG. 14 when $\Delta t=1$ and the initial value is varied. The initial value shown in FIG. 14 represents a variation from ½, and ± indicates ½+0.0025 and ½−0.0025. From the points of (½- - - ½), the initial value is converged to the internal unstable point. To the contrary, when a value obtained by adding a very small amount to one element, or subtracting such a very small amount therefrom is employed as the initial value, this initial value is converged into a solution for satisfying the constraint. However, when the very small amount is added to, or subtracted from all of the elements, this initial value is converged into a solution not for satisfying the constraint. As previously described, it should be understood that there is a particular advantage that the very small amount is added to any of the initial values when the initial values are set to the central points and are not converged.

(D) Improvement in Convergence

In the traveling salesman problem of n=2 as represented in (C), only two initial values (+000) and (−000) among the given initial values could converge into the solution for satisfying the constraint. However, the initial values other than the initial values of (½, - - - , ½) under the process for setting the obtained solutions in an unstable condition converged into the solution for satisfying the constraint condition. Also the solutions of (½, - - - , ½) converged into the solutions for satisfying the constraint condition by adding the very small amount to a certain element of the initial value, or subtracting this amount from the element.

(E) Integral Calculation Method

There are shown in FIGS. 15 and 16 examples in which solutions are improved by increasing diagonal elements with respect to 10 cities and 13 cities. In the 10-city case, there are 10!/20−181,440 sets of solution combinations. When the initial value was selected to be:

$X_i=½+0.03, X_j=½$ $i=2, - - -, 100$ it was obtained that the energy was −9.92. FIG. 15 represents the solutions when the values of the diagonal elements are successively increased with respect to "i" when $X_i=1$ at this time. When $T_{77,77}$ was increased by 0.8, it was obtained the solution of the energy "−10.47". It could be confirmed that this solution corresponded to the minimum value by investigating all of the combinations. It could also be found out that even when the increased values were selected to be 0.2 and 0.4, the solutions near this minimum value could be obtained.

As to the 13-city case, a quantity of combinations amounts to 239,500,800. With respect thereto, FIG. 16 shown a result obtained by improving the solutions under the following condition:

$X_i=½+0.03, X_j=½, i=2, - - -, 169$

It could be confirmed that the minimum value was −133.67 by checking all of the combinations. When $T_{42,112}$ was increased by 0.2, the minimum value was obtained. Similarly, when $T_{42,112}$ was increased by 3.0, the calculation result was $-133.67$ which is extremely close to the minimum value.

In FIG. 17, there is shown results obtained by varying the initial value in contrast to the method for increasing the diagonal element. This figure represents the 10-city case, in which the initial value is selected to be:

$$X_1 = X_i = \tfrac{1}{2} + \Delta x (\Delta x = 0.03, 0.04)$$

It should be noted that "i" was set to the number of the initial values. At this time, the minimum value is obtained under condition of:

$$X_{49} = \tfrac{1}{2} + 0.04.$$

As previously described, the convergence is improved with the above-described methods, and therefore the minimum value which could be hardly calculated with the conventional less sequence can be finally obtained in accordance with the present invention.

In FIG. 18, there is shown a convergence characteristic under such a condition that with respect to the traveling salesman problem of n=2, when the integral unit $\Delta t$ is varied, n=2, A=B=2.5, D=1, $d_{xy}=1$. As apparent from this figure, if the integral unit $\Delta t$ is selected to be large within a range where the monotone convergence characteristic of the energy is satisfied, there exists a higher reliability to obtain such a solution to satisfy the constraint condition. Also, it is useful to vary the integral unit $\Delta t$.

(E) Solution Converged into Boundary

In accordance with the conventional method, when the solution converged into the boundary plane other than the extreme point, this meaning could not be interpreted. However, when embodying the present invention, it is possible to be converted into the solution of the extreme point.

When the present invention is applied to various systems in the technical fields such as a transportation problem, since the various constants may be determined without the trial and error approach, the present invention may be readily applied thereto. Furthermore, the present invention may be simply utilized even when the construction such as connecting relationships of a network is changed. Because either the optimum solution, or the solution near the optimum solution may be obtained according to the present invention, there is a particular advantage that the system maintenance cost may be lowered.

A description will now be made of one example of the complete applications.

A distributing line to supply electric power to homes is provided in a network form along roads. Switches are also provided in a proper interval. By cutting a part of these switches, the power supply system is operated without forming a loop. When an electric work is carried out at some place in this distributing line, the flow of the current is changed by properly changing this switch in order that no power supply interruption occurs at any places. This causes a large scale combination matter.

When an LSI (large-scale integration), which is one of the elements constituting a computer, is designed, a group of logic gates so-called "LSI modules" must be packaged on this chip in high efficiency. To this end, it is necessary to determine such an arrangement that all of wiring line lengths among the LSI modules are minimized. This may also cause a large-scale combination problem. An optimum arrangement of an LSI module having approximately 10K gates scale, which is presently available product, may be determined by way of a neuron computer when the present invention is applied. It is of course possible to apply the present invention to various optimum combination matters or problems without being limited to these discrete examples.

The above-described two problems would correspond to the problem on 100 to 1000 cities if they would be substituted by the traveling salesman problem, and thus a total number of the combinations amounts to an astronomical numeral. Then, it has been taken a long time to obtain a proper solution without utilizing the neuron computer. Even when such a neuron computer is employed, such a large-scale problem cannot be properly processed in accordance with the conventional trial and error method. To the contrary, since the trial and error portion may be eliminated according to the present invention, the neuron computer may be applied to such a practical large-scale problem. Furthermore, when the present invention is technically combined with the hardware such as parallel processing computers, the large-scale combination problems may be solved in more higher velocity.

In addition, another embodiment of the present invention suitable for solving such a problem to which inequality constraint has been given will now be described. In FIG. 4, reference numeral 1 indicates a CPU, reference numeral 2 denotes a memory; reference numeral 3 represents a program to solve an optimum combination problem; and reference numeral 4 is a data are used by the program 3. When a combination problem is solved, upon initiation of the program 3, the program 3 executes computation in accordance with the input data with employment of the data area 4 and outputs a computation result.

Figure 19:
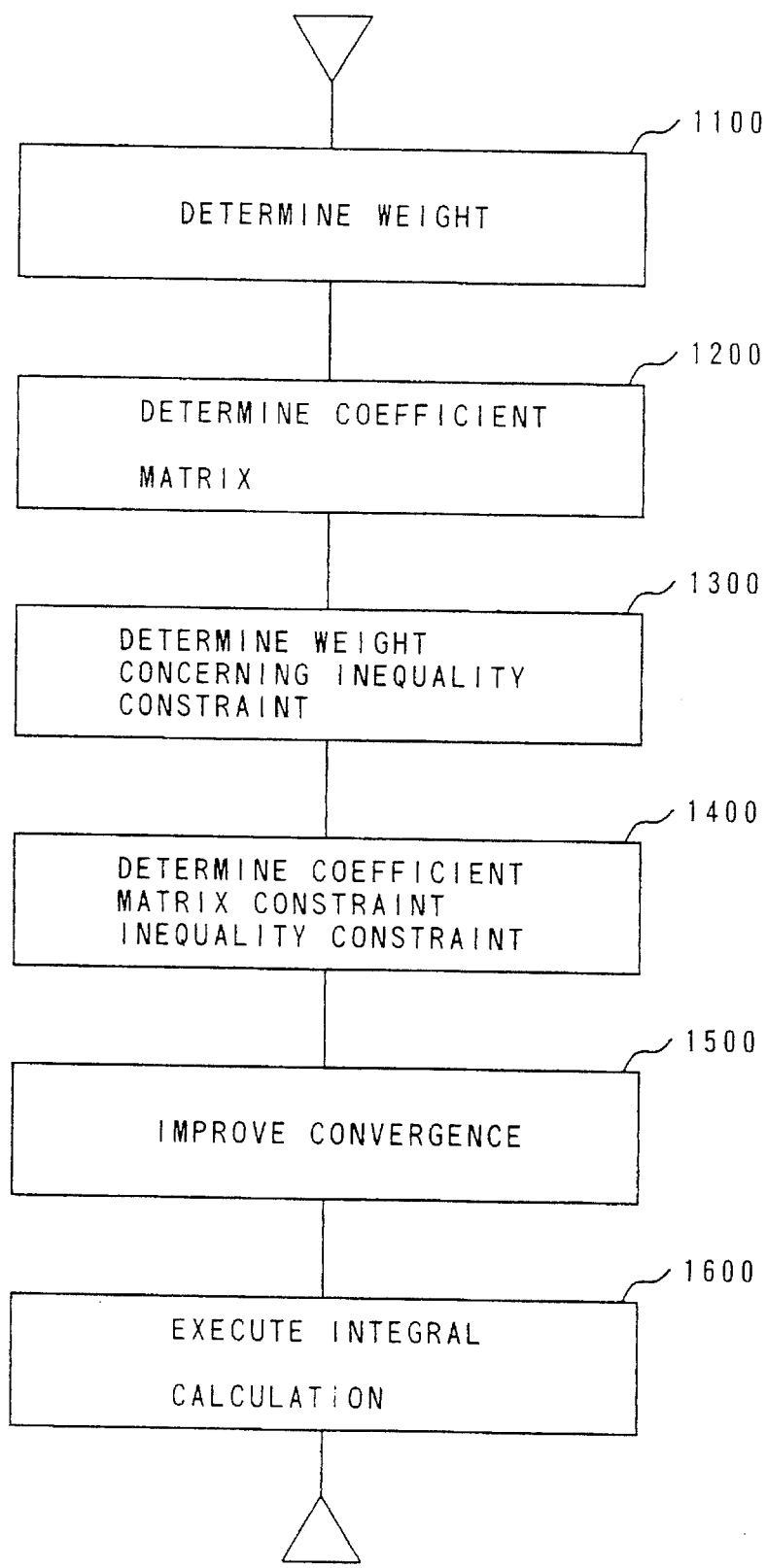
FIG. 19 represents another embodiment of the present invention.

In FIG. 19, there is represented an operation sequence of the program 3. In this figure, reference numeral 1100 denotes a step for determining weights of an objective function and a constraint condition; reference numeral 1200 represents a step for determining a coefficient matrix of the objective function and constraint condition; reference numeral 1300 indicates a step for determining a coefficient matrix with respect to inequality constraint; reference numeral 1400 represents a step for determining a coefficient matrix related to the inequality constraint; reference numeral 1500 indicates a step for improving convergence; and reference numeral 1600 is a step for executing an integral calculation.

Each of these steps will now be described in detail. The step 1100 for determining the weights concerning the objective function and equality constraint condition is represented as in FIG. 20.

It is assumed that energy is given as follows:

$$E = \omega_0 f(x) + \omega_1 g_1(x) + \ldots + \omega_n g_n(x) + \omega_{n+1} h(x, y) \tag{98}$$

This equation corresponds to an equation obtained by further dividing the constraint condition of the previous equation (82), in which "f" indicates an evaluation function, "$g_1$" to "$g_n$" denote an equality constraint condition, "h" indicates an inequality constraint condition, and "$\omega_0$" to "$\omega_{n+1}$" are weights.

Figure 20:
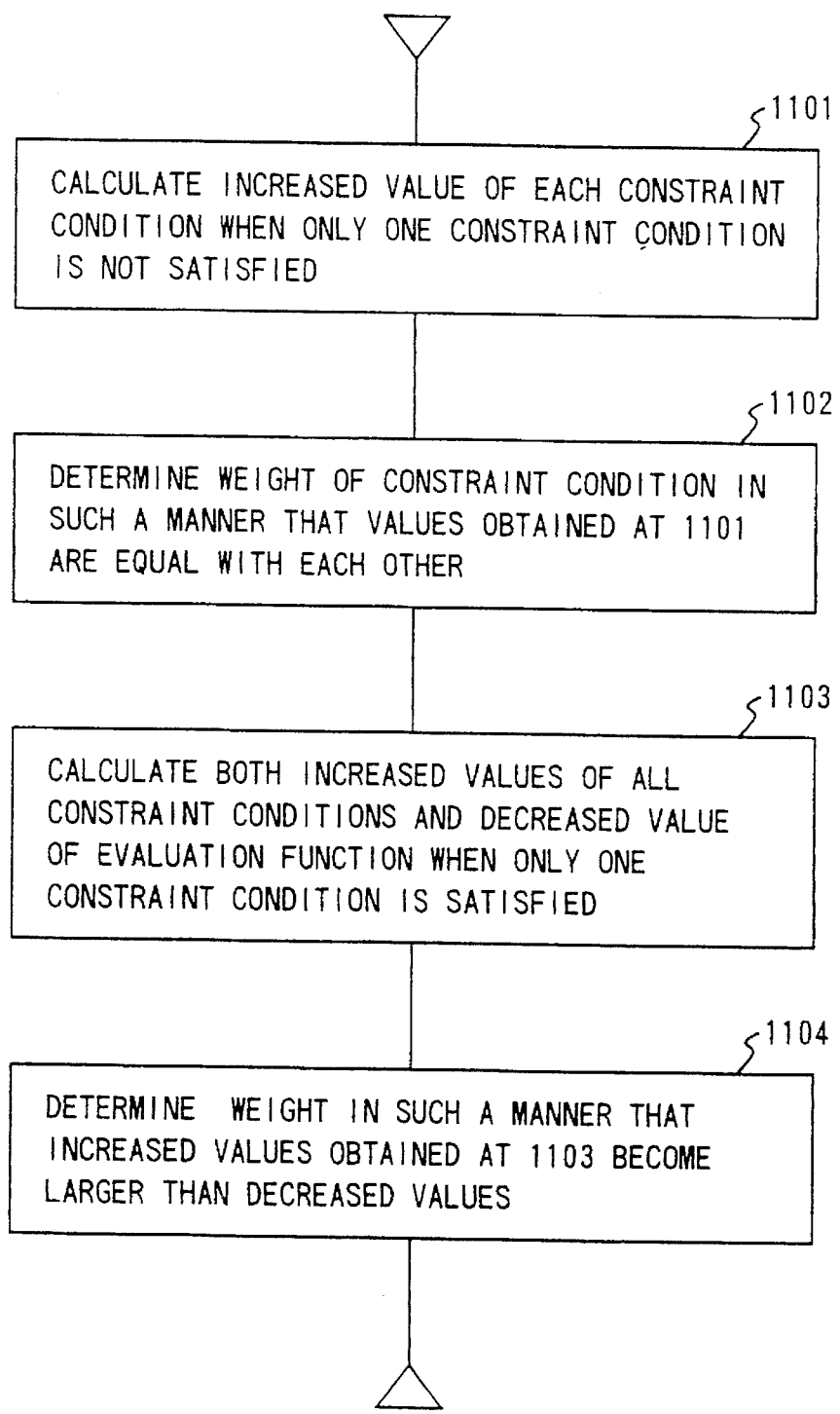
FIG. 20 is an explanatory diagram of a method of determining weights of an objective function and an equality constraint condition.

At this time, in FIG. 20,

1101 - - - Increased values of the constraint conditions $g_1$ to $g_n$ when only one constraint condition is not satisfied are calculated.

1102 - - - Assuming now that the increased values for $g_1$ to $g_n$ obtained at the previous step 1101 are $\Delta g_1$ to $\Delta g_n$, ratio of $\omega_1$ to $\omega_n$ is determined in such a manner that $\omega_1 \Delta g_1$ to $\omega_n \Delta g_n$ are equal to each other. As a result, it is assumed that the equality constraint term is determined as:

$$\omega_1(g_1+d_2g_2+\ldots+d_ng_n) \quad (99)$$

It should be noted that "$d_2$" to "$d_n$" are constants.

1103 - - - The increased values of the constraint conditions when only one constraint condition is not satisfied in accordance with the formula (91) are calculated. The minimum value of the calculated increased values is defined as $\omega_1\Delta g$. Also, the decreased value of the evaluation function is calculated at this time, and the maximum value is defined as $\omega_0\Delta f$.

1104 - - - The values of $\omega_1$ and $\omega_0$ are determined in such a manner that $\omega_1\Delta g > f$.

Subsequently, the step for determining the coefficient matrix related to both the objective function and equality constraint condition will now be described with reference to FIG. 21.

1201 - - - With respect to the term in the formula (92) for giving the energy except for the inequality constraint condition, the following equation is given:

$$E = \frac{1}{2} x^t T x + b^t x$$

Both the nxn-order coefficient matrix T' and n-order input vector b are determined.

1102 - - - The input vector's element bi is corrected by:

$$b_i \leftarrow b_i + T_{ii}'/2$$

In connection therewith, $T_{ii}'$ is set to zero.

With the above-described steps 1100 and 1200, both the coefficient matrix and weight have been determined in such a manner that the solution for satisfying the equality constraint becomes stable.

Figure 22:
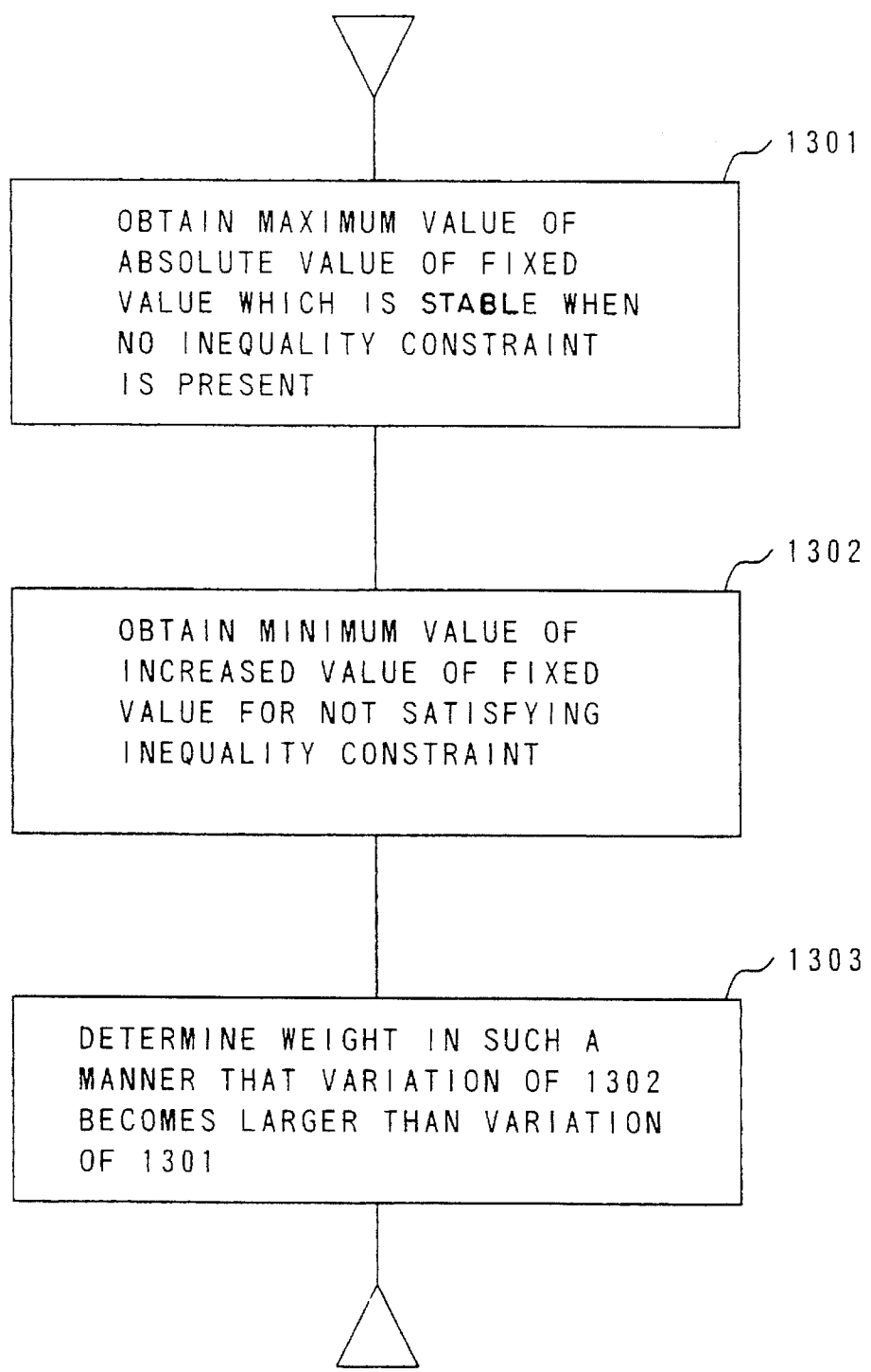
FIG. 22 is an explanatory diagram of a method of determining a weight related to an inequality constraint condition.

Thereafter, FIG. 22 represents a method for determining the weight with respect to the inequality constraint.

1301 - - - A maximum value of an absolute value of a stable fixed value when there is no inequality constraint is obtained based upon the equation (85).

1302 - - - An increased value of a fixed value when the inequality constraint is not satisfied is obtained from the equation (79). Further, a minimum value of the increased values is obtained.

1303 - - - The weight "C" is calculated in order to satisfy the equation (86) and the resultant weight is used as $\omega_{n+1}$ for the equation (92).

Figure 23:
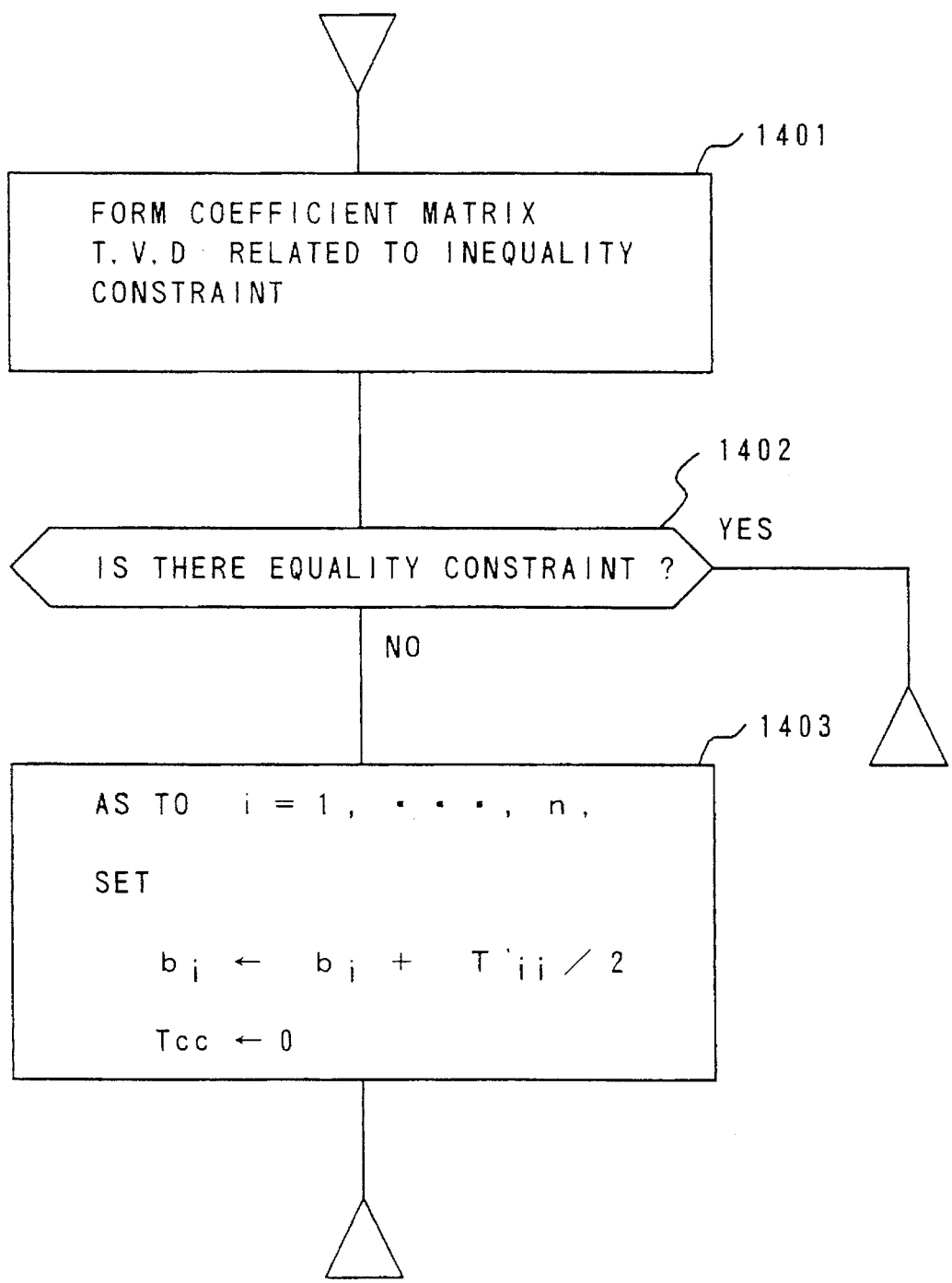
FIG. 23 is an explanatory diagram of a method of determining a coefficient matrix related to an inequality constraint condition.

Referring now to FIG. 23, the step for determining the coefficient matrix related to the inequality constraint will be described.

1401 - - - Based upon the term $\omega_{n+1}h(x, y)$ related to the inequality constraint in the energy given by the equation (92), $T=T'+\omega$, VD of the equation (59) are formed.

1402 - - - If there is the equality constraint in the equation (92), then the process is ended. Otherwise, the process is advanced to a step 1403.

1403 - - - The element "bi" of the input vector is corrected as follows:

$$b_i \leftarrow b_i + T_{ii}/2 = b_i + W_{ii}/2$$

In connection thereto, $T_{ii}$ is set to zero.

Figure 24:
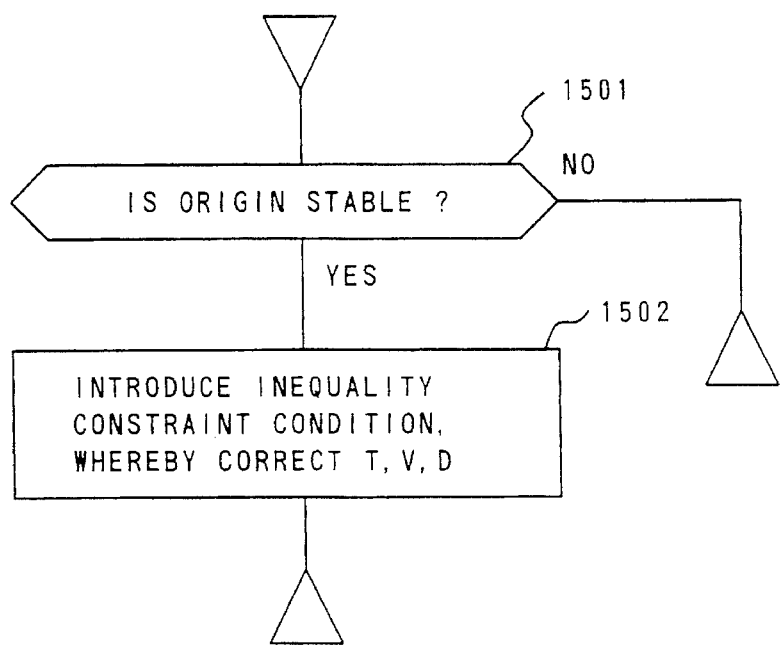
FIG. 24 is an explanatory diagram of a method of improving convergence.

In FIG. 24, there is shown the step for improving the constraint.

1501 - - - If an origin satisfies the inequality constraint condition and all of the elements of the input vector are not equal to negative, then the process is advanced to a step 1502. Otherwise, the process is accomplished.

1502 - - - T, V and D are corrected by introducing the inequality constraint equation (89) and setting the energy to the equation (90). At this time, the weight "F" of the equation (90) is determined by the equation (91).

Figure 25:
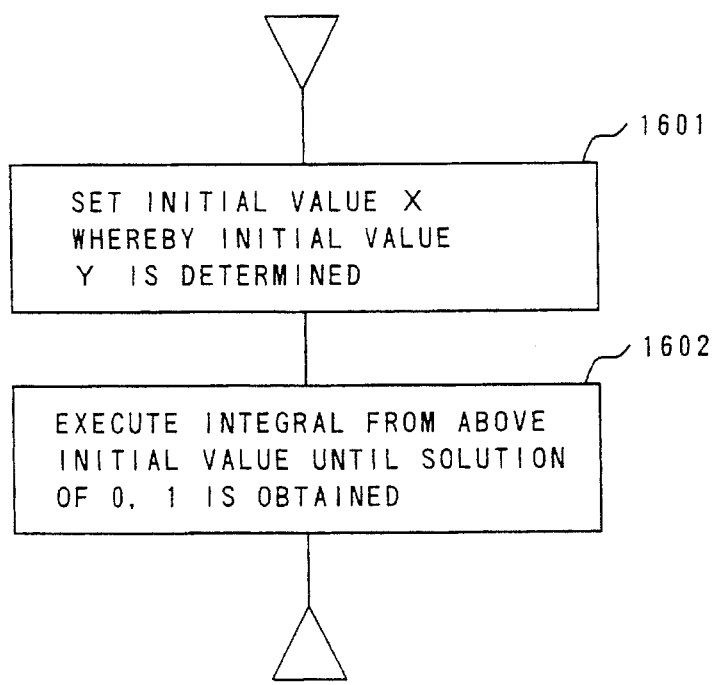
FIG. 25 is an explanatory diagram of an execution of an integral.

The step 1600 for executing the integral calculation is shown in FIG. 25.

1601 - - - An initial value for X where $1>X_i>0$, $i=1, \ldots, n$ is set, which is applied to the inequality constraint equation (55), whereby $Y_j$ $j=1, \ldots, k$ is set.

1602 - - - Based upon either the equations (57) to (59), or equation (60), the integral calculation is performed from the above-described initial value. When a solution of 0.1 is obtained, the process is ended.

Then, as the problem with the inequality constraint, a knapsack problem will now be described in accordance with another embodiment. This knapsack problem is as follows. Articles each having different prices are packed in the knapsack in such a manner that a total price thereof becomes maximum, which may be regarded as such case where the process management problem has been simplified. If this is represented by one dimension, then:

$$\text{maximum: } \sum_{i=1}^{n} a_i x_i$$

$$\text{constraint: } d \geq \sum_{i=1}^{n} v_i x_i$$

where:

$a_i$: price for article i $v_i$: size of article i d: size of case

When this is transformed into a neuronal model, assuming now that:

$$\text{minimum: } \frac{1}{2}\left(as - \sum_{i=1}^{n} a_i x_i\right)^2, \; as = \sum_{i=1}^{n} a_i \quad (100)$$

$$\text{constraint: } dy - \sum_{i=1}^{n} v_i x_i = 0 \quad 1 \geq y \geq 0 \quad (101)$$

it becomes:

$$E = \frac{1}{2}\left(as - \sum_{i=1}^{n} a_i x_i\right)^2 + \frac{1}{2}A\left(dy - \sum_{i=1}^{n} v_i x_i\right)^2 \quad (102)$$

The procedure as defined in FIG. 19 is applied to this equation (96). In the equation (96), since no equality constraint is present, no process is performed at the step 1100. When the step 1200 for determining the coefficient matrix is performed, it becomes based upon the step 1201 of FIG. 21:

$$T = \begin{pmatrix} a_1^2 & \cdots & a_1 a_n \\ \vdots & & \vdots \\ a_n a_1 & \cdots & a_n^2 \end{pmatrix}$$

$$b = \begin{pmatrix} -as \cdot a_1 \\ -as \cdot a_n \end{pmatrix}$$

Based on the step 1202, it further becomes:

$$T = \begin{pmatrix} 0 & \cdots & a_1 a_n \\ \vdots & \ddots & \vdots \\ a_n a_1 & \cdots & 0 \end{pmatrix} \quad (103)$$

-continued $$b = \begin{pmatrix} -as \cdot a_1 + \frac{a_1^2}{2} \\ \vdots \\ -as \cdot a_n + \frac{a_n^2}{2} \end{pmatrix}$$

Next, a decision is made of the weight related to the inequality constraint by the process defined in FIG. 22. At a step 1301, the fixed value obtained when no inequality constraint exists is obtained from the equation (74) as follows:

$$\lambda_{c,i} = 2(2c_i - 1)\left\{ \sum_{j \neq i} a_i a_j c_j - as \cdot a_i + \frac{a_i^2}{2} \right\}$$

$$= 2(2c_i - 1) a_i \left\{ \sum_{j \neq i} a_j (c_j - 1) \frac{a_i}{2} \right\}$$

$$< 0 \quad c_i = 1, \quad > 0 \quad c_i = 0$$

As a consequence, only when $C_i=1$ ($i=1, \cdots, n$), it becomes stable. The fixed value when $C_i=1$ becomes:

$$\lambda_{c,i} = -a_i^2 \qquad (104)$$

At a step 1302, since the increased value of the fixed value is equal to "2 dAVi" in violation of constraint based upon the equation (79), "A" may be determined at a step 1303 under such condition:

$$2dAV_i - a_i^2 > 0 \quad i=1, \cdots, n \qquad (105)$$

It should be noted that assuming now that "d" and "$V_i$" are integers, since the minimum value of "d" becomes 1, the solution not for satisfying the inequality constraint condition becomes unstable when the following formula (99) is satisfied for at least any "i":

$$A > a_i^2 / 2V_i \qquad (106)$$

Subsequently, the coefficient matrix related to the inequality constraint is determined from FIG. 23. At a step 1401, it becomes:

$$W = A \begin{pmatrix} V_1^2 & \cdots & V_1 V_n \\ \vdots & & \vdots \\ V_1 V_n & \cdots & V_n^2 \end{pmatrix}$$

$$V = -A \begin{pmatrix} dV_1 \\ \vdots \\ dV_n \end{pmatrix}$$

$$D = [d^2]$$

Since no equality constraint exists at a step 1402, then the process is advanced to a step 1403.

$$T = T + W = T + A \begin{pmatrix} 0 & & V_1 V_n \\ & \ddots & \\ V_1 V_n & & 0 \end{pmatrix} \qquad (107)$$

$$b = \begin{pmatrix} -as \cdot a_1 + \frac{a_1^2}{2} + \frac{A}{2} V_1^2 \\ \vdots \\ -as \cdot a_n + \frac{a_n^2}{2} + \frac{A}{2} V_n^2 \end{pmatrix}$$

Thereafter, the process is advanced to an improvement step 1500. An origin satisfies the inequality constraint at a step 1501 of FIG. 24. If the following formula is satisfied at any "i" of $i=1, \cdots, n$, as the origin does not become stable, the process is completed:

$$-as \cdot a_i + \frac{a_i^2}{2} + \frac{A}{2} V_i^2 < 0$$

Next, at a step 1601 of FIG. 25, "$X_i$" is determined in such a manner that the initial value becomes $1 \geq X_i \geq 0$. As a result, "y" is determined by the formula (95). Based upon the initial value (x, y), a resolution may be obtained at a step 1602.

Then, a transportation problem according to another embodiment will now be represented. As to the transportation problem, it is constructed of transportation paths for connecting relay points with each other. Transportation costs have been determined for the respective transportation paths. In this transportation system, there is a problem how to select a route with a minimum transport cost when a cargo is transported from a certain relay point to another relay point.

Energy "E" with respect to such a transportation problem is given as follows:

$$F = A/2 \sum_{i=1}^{n} \left( I_i + \sum_{j \in N(i)} (b_{ji} - b_{ij}) \right)^2 + \qquad (108)$$

$$B/2 \sum_{i=1}^{n} \sum_{j \in N(i)} b_{ji} \cdot b_{ij} +$$

$$D/2 \sum_{i=1}^{n} \sum_{j \in N(i)} (b_{ji} + b_{ij}) c_{ij}$$

It should be noted that as to the first term at each relay point, under such a constraint condition that the incoming/outgoing transportation amount is equal to zero, Ii: corresponds to the transportation amount of the i-th relay point into which a cargo is injected from an external point and from which a cargo is derived to the external point. If this relay point corresponds to a starting point, $I_i=1$. If this relay point corresponds to an ending point, $I_i=-1$. If this point corresponds to any point other than the starting and ending points, $I_i=0$.

bij: corresponds to a variable "1" when the cargo is transported from the i-th relay point to the j-th relay point, and to another variable "0" when no cargo is transported therebetween.

N(i): corresponds to a set of the relay points connected to the relay point "i".

n: corresponds to a total number of the relay points.

A: corresponds to a weight.

Also, in the second term, the relay points "i" and "j" correspond to constraint whether or not the cargo is transported from "i" to "j" or "j" to "i" and B corresponds to a weight.

The third term represents a total cost for the transportation.

Cij: corresponds to a cost for the transportation effected between the relay points "i" and "j".

D: corresponds to a weight.

A solution of the above-described transportation problem or matter corresponds to such a case that only equality constraint is present, and may be obtained in accordance with the sequence shown in FIG. 1.

The weight may be determined in accordance with the sequence of FIG. 20 at the step 1101. When the first and second terms are out of the constraint conditions, the increased values of the energy correspond to "A" and "B". From the step 1102, it is set:

$$A = B \qquad (109).$$

Since the minimum value of the increased values of the constraint conditions is not satisfied at the step 1103, and also the maximum value of the decreased value in the third term is equal to $D_{max}c_{ij}$, it is set at the step 1104 as follows:

$$A > D_{max}c_{ij} \quad (110)$$

Figure 21:
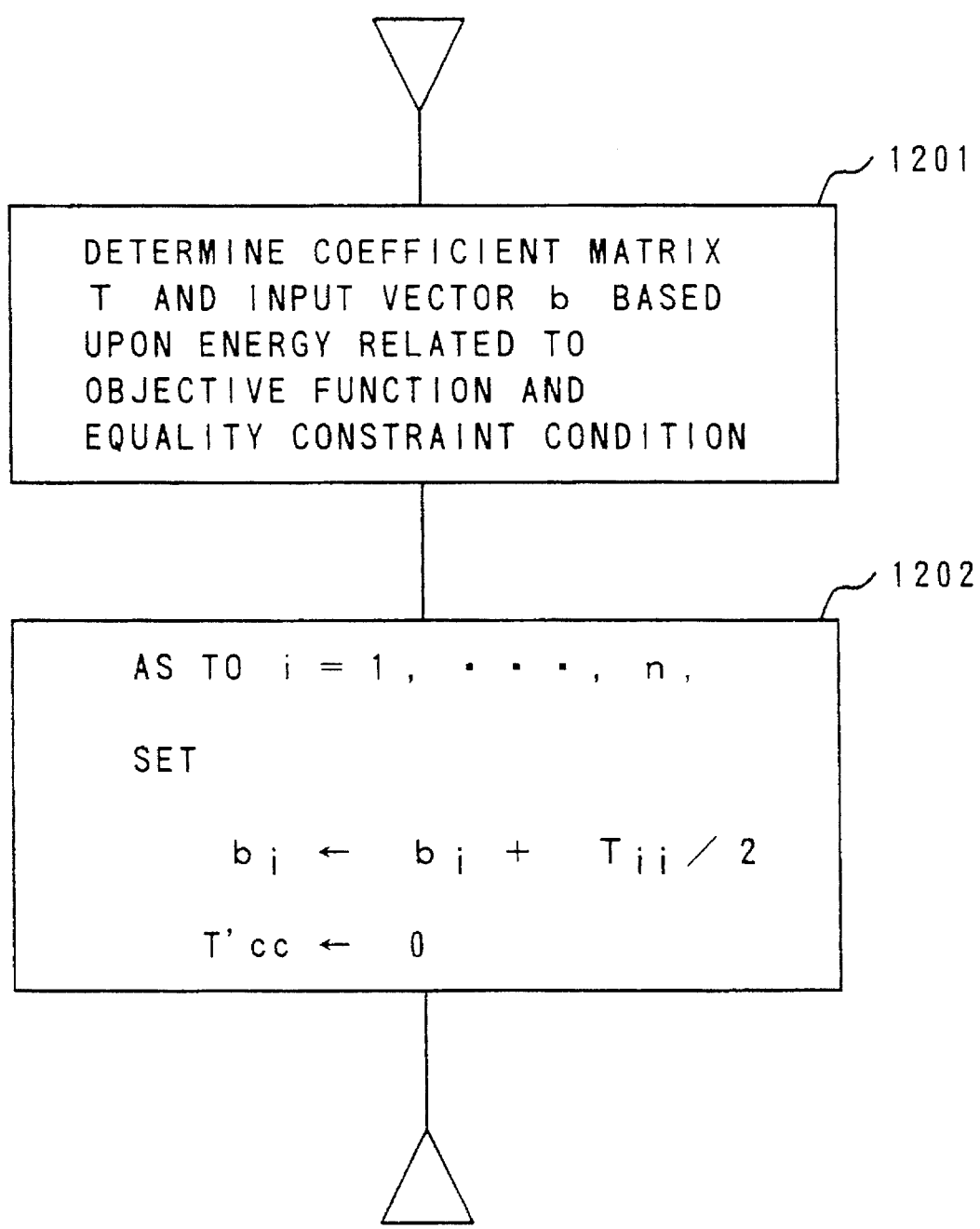
FIG. 21 is an explanatory diagram of a method of determining a coefficient matrix related to an objective function and an equality constraint condition.

At this time, the coefficient matrix becomes at the step 1201 of FIG. 21:

$$T = \begin{matrix} & ij & ji & ik & ki \\ ij & \begin{pmatrix} 2A & -A & A & -A \\ -A & 2A & -A & A \end{pmatrix} \end{matrix}$$

$$b = \begin{pmatrix} -AI_i + AI_j + Dc_{ij}/2 \\ AI_i + AI_j + Dc_{ij}/2 \end{pmatrix} \begin{matrix} ij \\ ji \end{matrix}$$

Then, this coefficient matrix becomes at a step 1202 thereof:

$$T = \begin{matrix} & ij & ji & jk & ki \\ ij & \begin{pmatrix} O & -A & A & -A \\ -A & O & -A & A \end{pmatrix} \end{matrix} \quad (111)$$

$$b = \begin{pmatrix} -AI_i + AI_j + Dc_{ij}/2 \\ AI_i + AI_j + Dc_{ij}/2 \end{pmatrix} \begin{matrix} ij \\ ji \end{matrix} \quad (112)$$

In accordance with this transportation matter, since there is no inequality constraint, no process is performed at the steps 1300 and 1400 of FIG. 19, and then the process is advanced to the step 1500 thereof.

At the step 1501 of FIG. 24, if the minimum distance between the directly connected relay points is not obtained, all of the elements of "b" become positive based upon the matrix (105), and the process is advanced to the step 1502.

When introducing the following inequality constraint:

$$\sum_{i=1}^{n} \sum_{j \in N(i)} b_{ij} \geq 1 \quad (113)$$

it is set with respect to the energy of the formula (101):

$$E' = E + \frac{F}{2} \left( y - \sum_{i=1}^{n} \sum_{j \in N(i)} b_{ij} \right)^2, y \geq 1 \quad (114)$$

At this time, it becomes from the formula (91):

$$F > Dc_{ij}/2 \quad (115)$$

However, when it necessarily becomes unstable by taking the maximum value in $c_{ij}$, thus it may be set:

$$F > D_{max}c_{ij}/2 \quad (116)$$

Next, the proper initial values of $1 \geq X_i \geq 0$, $i=1,---,n$ are set to "X" at the step 1601 of FIG. 25 so as to determine "y", and may be integrated until a solution of 0.1 is obtained at the step 1602.

Now, various application examples will be described.

(i) Model of Neuron Computer
In case of Inequality Constraint.

Figure 26:
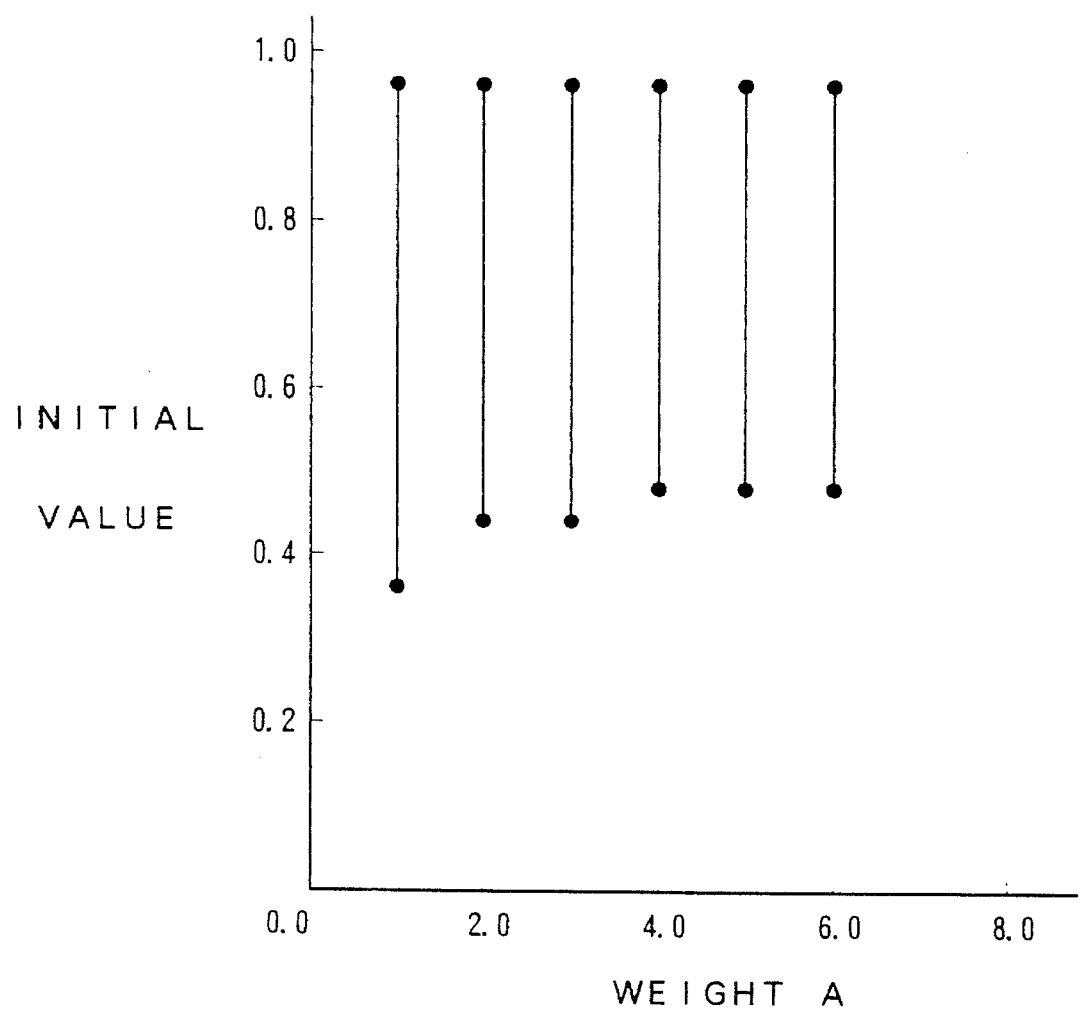
FIGS. 26 to 28 are representations for explaining advantages of the present invention.

As to the knapsack problem, a range for obtaining an optimum solution is shown in FIG. 26 under such conditions: it is set to n=6, and d=18 under:

$$\left.\begin{matrix} a_1 = 1, & a_2 = 2, & a_3 = 3, & a_4 = 4, \\ a_5 = 5, & a_6 = 6 \\ v_1 = 3, & v_2 = 6, & v_3 = 1, & v_4 = 5, \\ v_5 = 4, & v_6 = 2 \end{matrix}\right\} \quad (117)$$

the initial values are varied by a width of 0.05 from 0.05 up to 0.95, and also the weight "A" is changed by a unit of 0.5 from 1.5 to 6. It could be obtained the solutions by the inequality constraint model according to the present invention.

Figure 27:
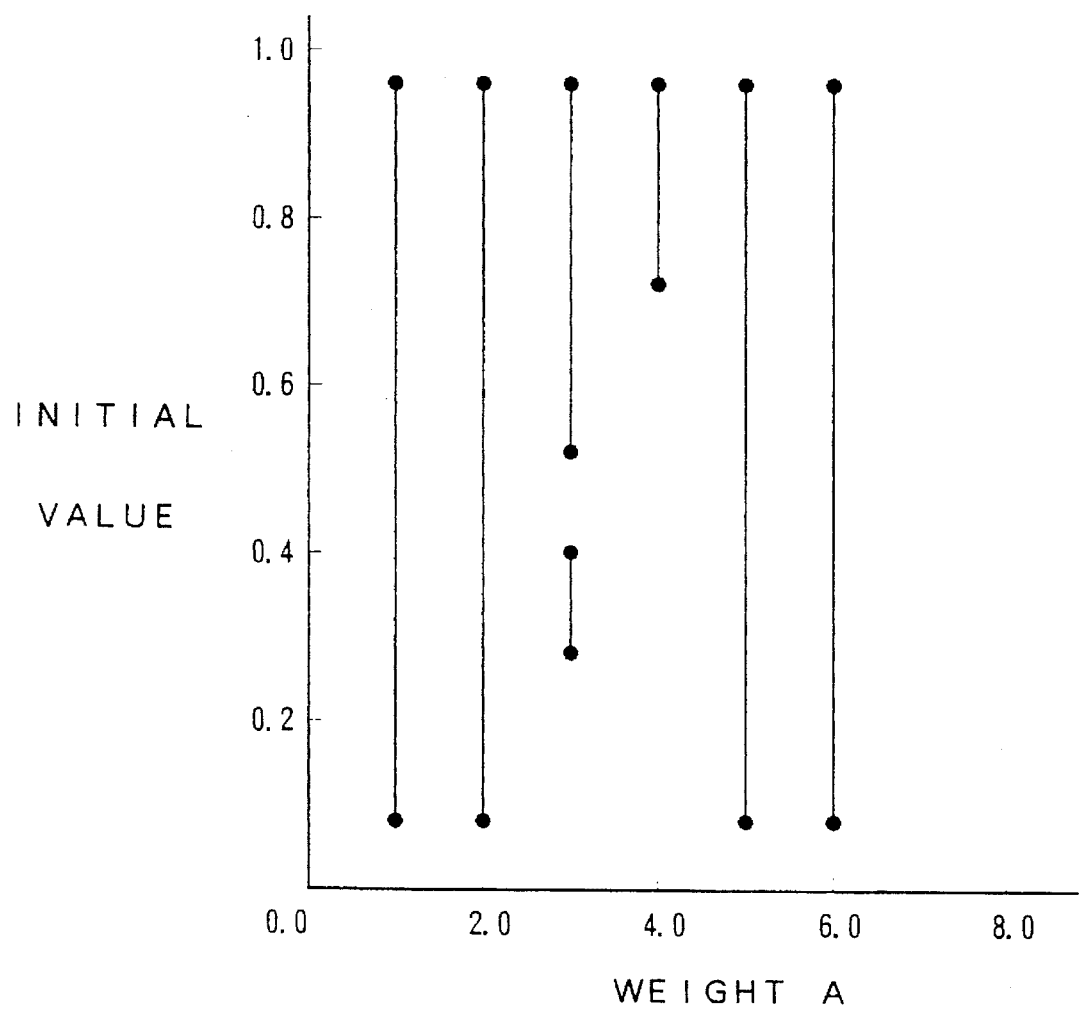
Figure 28:
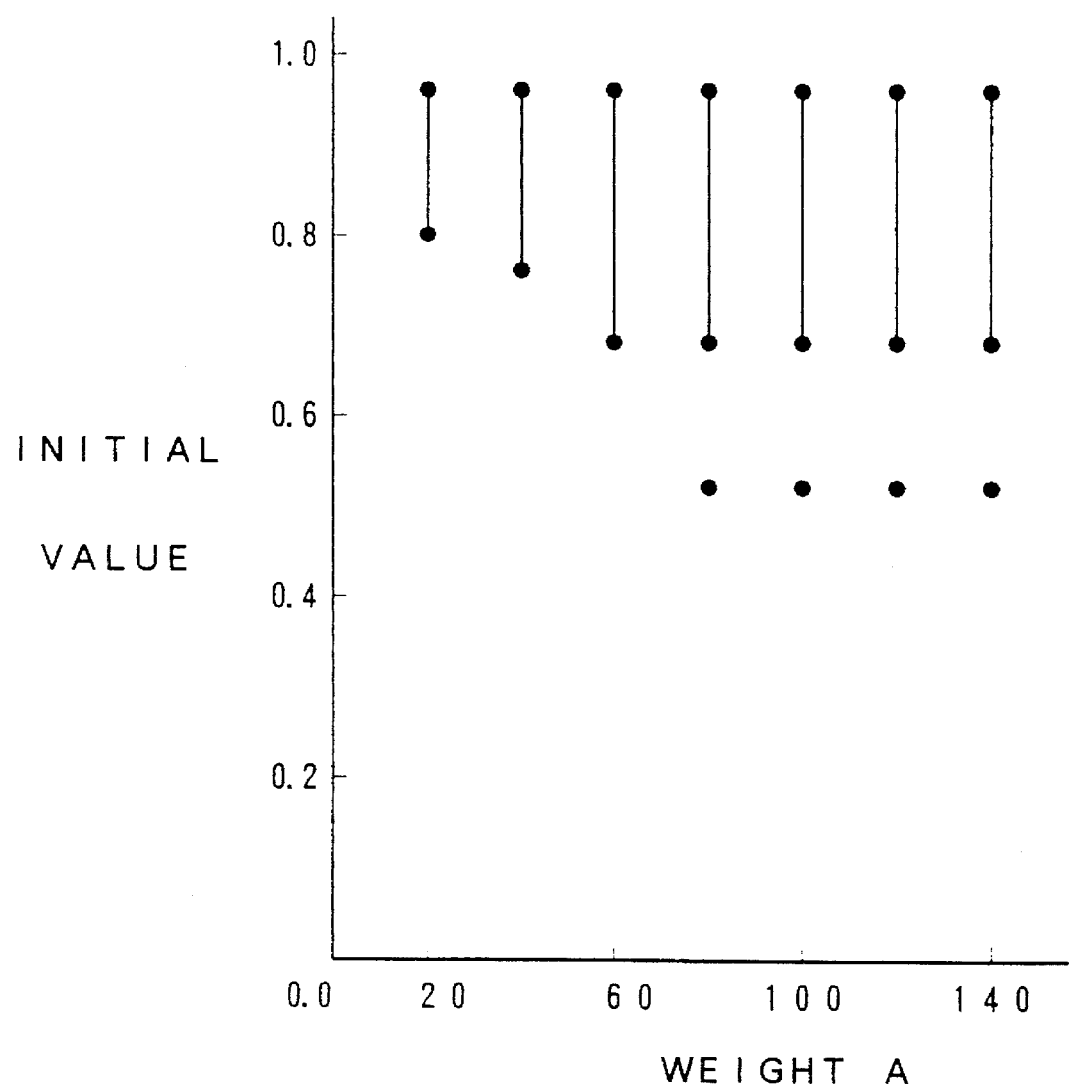

(ii) Decision on Weight in Energy
In the knapsack problem, since no equality constraint is present, when d=18 in the formula (110), the solution is obtained as shown in FIG. 27 in case that the term $X_i^2$ of the inequality constraint has not been transformed into $X_i$. This implies that the solution of FIG. 26 has converted in more stable condition than that of FIG. 27. When d=10, the solution could not properly be obtained unless the above-described transformation is carried out. As represented in FIG. 28, the optimum solution may be however, obtained if the above-described transformation is carried out.

Also, since the weight of the inequality constraint becomes as follows based upon the formula (99):

$$a_i^2/2V_i = (0.16, 0.33, 4.5, 1.6, 3.1, 9)$$

at least it may be set to $$F > 0.16$$

In FIG. 26, the solution has been obtained under condition of F=1.0.

Figure 29:
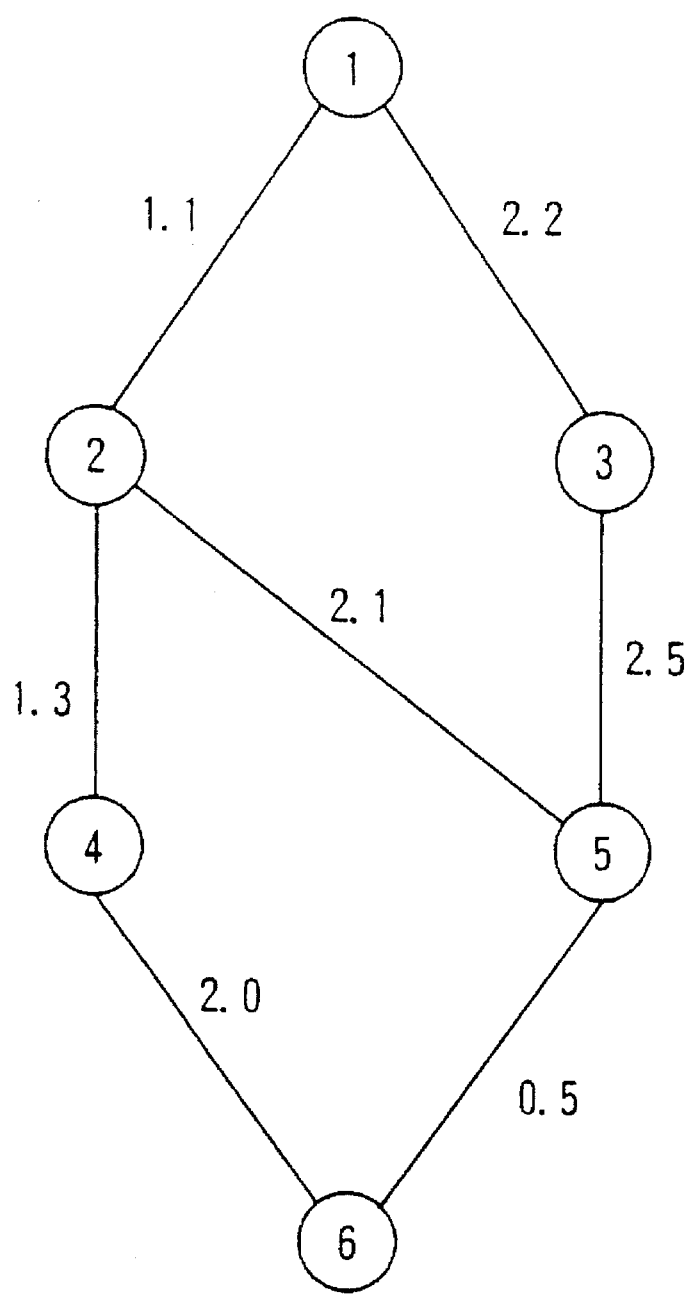
FIG. 29 is a schematic diagram for representing an example of a transportation matter; and, FIGS. 30 and 31 are representations for explaining advantages of the present invention.

(iii) Improvement in Convergence
It is assumed that the construction of the network for the transportation problem corresponds to FIG. 29. It should be noted that reference numerals 1 to 6 shown in this figure are relay points, and values appearing on branches for connecting the respective relay points represent transportation costs. A weight may be set as follows from the formula (103), assuming D=1:

$$A > \max c_{ij} = 2.5$$

Figure 30:
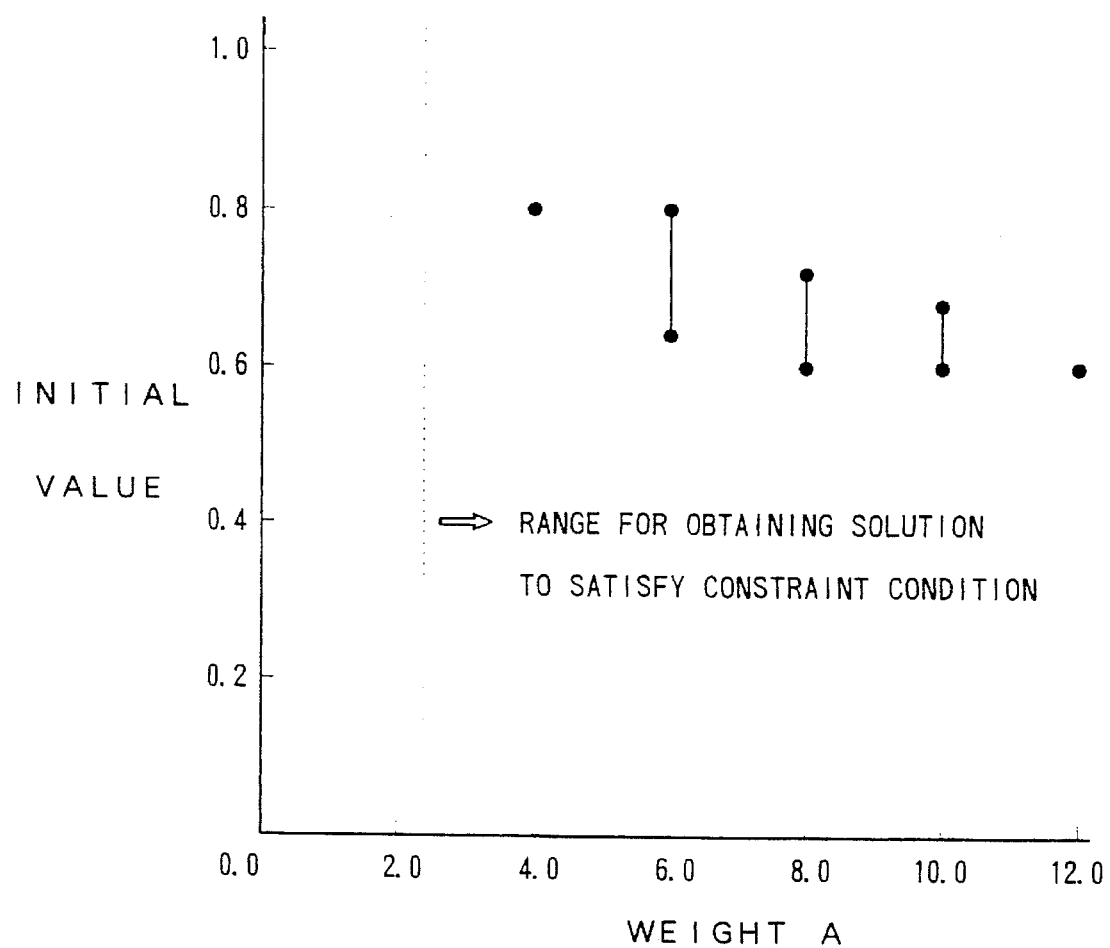

In FIG. 30, there are shown shortest distances along 1 to 6 under condition that the initial value is varied by a step of 0.05 from 0.05 to 0.95, and also a range where a minimum value is obtained by changing the weight with a step of 2 from 2 to 12, in particular with a step of 0.5 from 2 to 4. At this time, it can be found that the convergence characteristic for the minimum value is considerably bad. To the contrary, if the inequality constraint of the formula (106) is conducted, the weight may be set as follows based upon the formula (109) under D=1:

$$F > \max c_{ij}/2 = 1.25.$$

Figure 31:
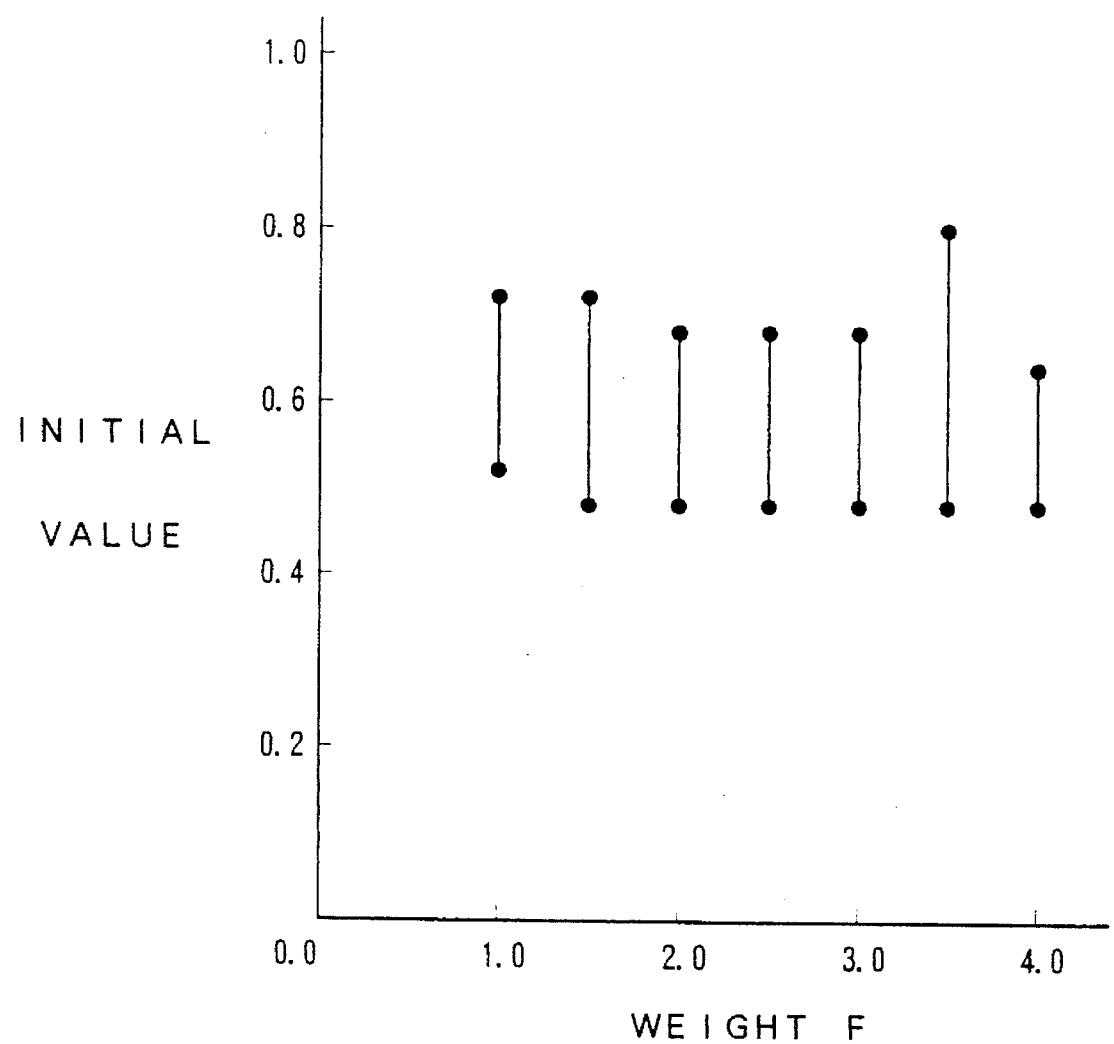

In FIG. 31, there is shown the convergence characteristic for the optimum value when the inequality constraint condition is accepted as A=3.0. When the inequality constraint is not accepted, the solution which has not converged can converge. As a consequence, it may be found that the convergence characteristic has been considerably improved.

We claim:

1. A data processing apparatus for obtaining an optimum combination of a plurality of variables, each of which takes a value within a range defined as between and including first and second predetermined values, by employing a neurocomputer in which a plurality of neurons representing said variables, respectively, are coupled with each other, and which is operated when some of these neurons become active, based on an energy function represented by a summation of at least a constraint condition function and an evaluation function, said constraint condition function determining a condition of the values to be taken by said neurons and including an equality function and said evaluation function determining an evaluation value representing a degree of optimality of a combination of the values taken by said neurons, said apparatus comprising at least one of:

(a) a weight determining apparatus for determining weights of said constraint condition function and said evaluation function based on a relationship between them in such a manner that an increase of the constraint condition function is smaller than a decrease of the evaluation function when a condition of one neuron is changed from an active state to an inactive state or from an inactive state to an active state so that a constraint condition is violated;

(b) an optimum combination apparatus for determining a solution of the optimum combination of neuron conditions by increasing coupling strengths for coupling outputs of the neurons to their inputs so as to make smaller a value of the energy function obtained when using weights as determined in said weight determining apparatus; and (c) a final state apparatus for obtaining final states of the neurons for the energy function using the weights as determined by setting an initial value of each neuron at a center of a region in which states of the neurons change and if a solution does not satisfy said constraint condition, adding a very small value to the initial value.

2. A data processing method of obtaining an optimum combination of a plurality of variables, each of which takes a value within a range defined as between and including first and second predetermined values, by employing a neuronal net in which a plurality of neurons representing said variables respectively, are coupled with each other, and which is operated when these neurons become active based on an energy function represented by a summation of at least a constraint condition function and an evaluation function, said constraint condition function determining a condition of the values to be taken by said neurons and including equality functions and said evaluation function determining an evaluation value representing a degree of optimality of a combination of the values taken by said neurons, said method comprising the steps of:

(a) determining a combination strength between every two of the neurons so as to make smaller an energy of a solution for satisfying a predetermined constraint condition that an energy of a solution obtained when a condition of one neuron is changed from an active state to an inactive state; and (b) obtaining a solution having a smaller energy and capable of making all the neurons stable based on the coupling strength between every two of the neurons, while gradually increasing a coupling strength for coupling an output of the neuron to its input.

3. A data processing method of obtaining an optimum combination of a plurality of variables, each of which takes a value within a range defined as between and including first and second predetermined values, by employing a neuronal net in which a plurality of neurons representing said variables, respectively, are coupled with each other, and which is operated when these neurons become active based on an energy function represented by a summation of at least a constraint condition function and an evaluation function, said constraint condition function determining a condition of the values to be taken by said neurons and including equality functions and said evaluation function determining an evaluation value representing a degree of optimality of a combination of the values taken by said neurons, aid method comprising the steps of:

(a) determining a combination strength between every two of the neurons so as to make smaller an energy of a solution for satisfying a predetermined constraint condition than an energy of a solution obtained when a condition of one neuron is changed from an active state to an inactive state; and (b) once obtaining a solution by which all the neurons are stable by using predetermined initial values of the variables based on the coupling strength between every two of the neurons;

(c) obtaining a solution having a smaller energy and capable of making all the neurons stable based on the coupling strength between every two of the neurons, while gradually increasing a coupling strength for coupling an output of the neuron to its input.

4. A data processing apparatus for obtaining an optimum combination of a plurality of variables, each of which takes a value within a range defined as between and including first and second predetermined values, by employing a neurocomputer in which a plurality of neurons representing said variables, respectively, are coupled with each other, and which is operated when some of these neurons become active, based on an energy function represented by a summation of at least a constraint condition function and an evaluation function, said constraint condition function determining a condition of the values to be taken by said neurons and including an equality function and said evaluation function determining an evaluation value representing a degree of optimality of a combination of the values taken by said neurons, said apparatus comprising:

a weight setting apparatus for setting weights of the constraint condition function and the evaluation function based on a relationship between them in such a manner that energy of a solution for satisfying a constraint condition becomes smaller than that of a solution in which a condition of one neuron is changed from an active state to an inactive state or from an inactive state to an active state.

5. A data processing apparatus as claimed in claim 4, wherein said energy function is represented by a summation of plural constraint condition functions and said evaluation function, and the weights of said constraint condition functions are determined so as to make equal increases of values of said constraint condition functions obtained, respectively, when a condition of one neuron is changed.

6. A data processing apparatus as claimed in claim 4, wherein the weights are set so as to make larger an increase of the constraint condition function, than a decrease of the evaluation function when a condition of one neuron is changed from an active state to an inactive state or from an inactive state to an active state so that the constraint condition is violated.

7. A data processing apparatus for obtaining an optimum combination of a plurality of variables, each of which takes a value within a range defined as between and including first and second predetermined values, by employing a neurocomputer in which a plurality of neurons representing said variables, respectively, are coupled with each other, and which is operated when some of these neurons become active, based on an energy function represented by a summation of at least a constraint condition function and an evaluation function, said constraint condition function determining a condition of the values to be taken by said neurons and including inequality functions and equality functions and said evaluation function determining an evaluation value representing a degree of optimality of a combination of the values taken by said neurons, said apparatus comprising:

a weight setting apparatus for setting weights of said constraint condition function and said evaluation function in such a manner that a solution for satisfying the constraint condition function becomes stable.

8. A data processing apparatus as claimed in claim 7, wherein the weights are set so as to make negative a real part of a fixed value of the solution.

9. A data processing apparatus for obtaining an optimum combination of a plurality of variables, each of which takes a value within a range defined as between and including first and second predetermined values, by employing a neurocomputer in which a plurality of neurons representing said variables, respectively, are coupled with each other, and which is operated when some of these neurons become active, based on an energy function represented by a summation of at least a constraint condition function and an evaluation function, said constraint condition function determining a condition of the values to be taken by said neurons and including an equality function and said evaluation function determining an evaluation value representing a degree of optimality of a combination of the values taken by said neurons, said apparatus comprising at least one of:

a variable setting apparatus for setting initial values of said neurons, and a dimension judging apparatus for judging whether or not all said neurons take values other than said first and second predetermined values when the same initial values are set;

wherein when all said neurons take values other than said first and second predetermined values, a value obtained by superimposing on at least a value of a center value, a value different from the center value is set as an initial value of said neurons.

10. A data processing method, implemented with a data processing apparatus, of obtaining an optimum combination solution of a plurality of variables, each of which takes a value within a range defined as between and including first and second predetermined values, by employing a neuronal set in which a plurality of neurons representing said variables, respectively, are coupled with each other, and which is operated when some of these neurons become active by integrating a differential equation derived from an energy function represented by a summation of an equality constraint condition function and an evaluation function, said method comprising the steps of:

applying, using an integration apparatus, a time integration to said neuronal set;

varying, using an integrating varying apparatus, a time unit of the time integration; and monitoring, using a monitoring apparatus, a change of a value of the energy function.

11. A data processing method as claimed in claim 10, further comprising a step of changing, using a changing apparatus, when a first value of the energy function obtained at a first time in the time integration is smaller than a second value of the energy function obtained at a second time deviated by a time unit after the first time, the time unit to a smaller value so as to make the energy function decrease between said first and second times larger.

12. A data processing method as claimed in claim 10, further comprising a step of changing, using a changing apparatus, when a first value of the energy function obtained at a first time in the time integration is larger than a second value of the energy function obtained at a second time deviated by a time unit after the first time, the time unit to a larger value while maintaining the energy function decrease between said first and second times.

13. A data processing apparatus for obtaining an optimum combination of a plurality of variables, each of which takes a value within a range defined as between and including first and second predetermined values, by employing a neurocomputer in which a plurality of neurons representing the variables, respectively, are coupled with each other, and which is operated when some of these neurons become active, based on an energy function represented by a summation of at least a constraint condition function and an evaluation function, said constraint condition function determining a condition of the values to be taken by said neurons and including inequality functions and equality functions and said evaluation function determining an evaluation value representing a degree of optimality of a combination of the values taken by said neurons, said apparatus comprising:

an inequality constraint introducing apparatus for improving convergence of the solution by introducing an inequality constraint condition function into the energy function, when a solution which unsatisfies the equality constraint condition function has a smaller energy than when a condition of any one neuron is changed from an active state to an inactive state or vice versa.

* * * * *